United States Patent
Wrenninge

(10) Patent No.: US 9,311,737 B1
(45) Date of Patent: Apr. 12, 2016

(54) TEMPORAL VOXEL DATA STRUCTURE

(71) Applicant: Pixar, Emeryville, CA (US)

(72) Inventor: Carl Magnus Wrenninge, San Francisco, CA (US)

(73) Assignee: PIXAR, Emeryville, CA (US)

(*) Notice: Subject to any disclaimer, the term of this patent is extended or adjusted under 35 U.S.C. 154(b) by 75 days.

(21) Appl. No.: 14/158,718

(22) Filed: Jan. 17, 2014

(51) Int. Cl.
*G06T 13/20* (2011.01)
*G06T 15/08* (2011.01)

(52) U.S. Cl.
CPC .............. *G06T 13/20* (2013.01); *G06T 15/08* (2013.01)

(58) Field of Classification Search
None
See application file for complete search history.

(56) References Cited

U.S. PATENT DOCUMENTS

| | | | |
|---|---|---|---|
| 6,664,961 B2* | 12/2003 | Ray et al. ...................... | 345/424 |
| 2002/0180747 A1 | 12/2002 | Lavelle et al. | |
| 2003/0234789 A1* | 12/2003 | Gritz ............................. | 345/474 |
| 2004/0125103 A1* | 7/2004 | Kaufman et al. ............ | 345/419 |
| 2005/0151734 A1* | 7/2005 | Gubkin et al. ................ | 345/424 |
| 2005/0179686 A1* | 8/2005 | Christensen et al. ......... | 345/423 |
| 2009/0040220 A1 | 2/2009 | Gibbs et al. | |
| 2014/0136159 A1* | 5/2014 | Chen et al. .................... | 703/2 |
| 2014/0267266 A1* | 9/2014 | Crassin et al. ................ | 345/424 |

OTHER PUBLICATIONS

Notice of Allowance dated Nov. 12, 2015, for U.S. Appl. No. 14/158,755, filed Jan. 17, 2014, 10 pages.
Notice of Allowance dated Nov. 12, 2015, for U.S. Appl. No. 14/158,740, filed Jan. 17, 2014, 10 pages.
U.S. Appl. No. 14/158,740, filed Jan. 17, 2014 by Carl Magnus Wrenninge (Unpublished).
U.S. Appl. No. 14/158,755, filed Jan. 17, 2014 by Carl Magnus Wrenninge (Unpublished).
Non-Final Office Action dated Jun. 25, 2015, for U.S. Appl. No. 14/158,755, filed Jan. 17, 2014, 14 pages.
Non-Final Office Action dated Jul. 6, 2015, for U.S. Appl. No. 14/158,740, filed Jan. 17, 2014, 22 pages.

* cited by examiner

*Primary Examiner* — Hau Nguyen
*Assistant Examiner* — Yi Wang
(74) *Attorney, Agent, or Firm* — Kilpatrick Townsend & Stockton LLP

(57) ABSTRACT

Systems and methods can be used to store data in a temporal voxel buffer. A first voxel array is stored in association with a first voxel in a voxel grid. The first voxel array includes a plurality of time values. A parameter value is stored in association with each time value of the first voxel array. A second voxel array is stored in association with a second voxel in the voxel grid. The second voxel array stores at least one time value. At least one parameter value is stored in association with the at least one time value of the second voxel array. At least one of the time values stored in the first voxel array is different from each of the at least one time value included in the second voxel array.

31 Claims, 15 Drawing Sheets

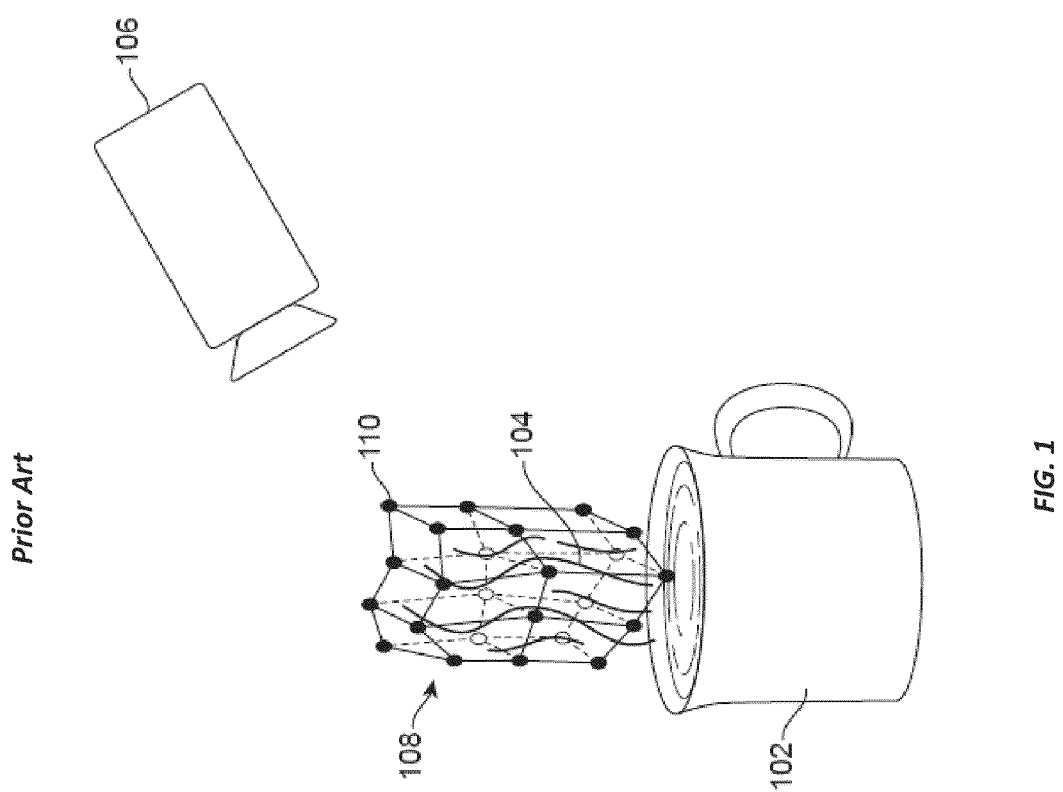

TEMPORAL VOXEL DATA STRUCTURE

BACKGROUND

The present disclosure generally relates to computer animation, and more specifically to motion blur simulation.

When a camera is used to create an image of a moving object, the object may appear blurred due to the motion of the object during the time over which the camera shutter is open to capture an image. Similarly, an object may appear blurred in a single frame of a movie recorded by a camera due to movement of the object while the frame was captured. "Motion blur" describes the blurred appearance of moving objects or other image components in a frame. In computer animation, motion blur may be simulated so that image components in motion have a blurred appearance similar to that produced when a moving object is imaged by a camera.

One existing approach to simulating motion blur is a smearing technique, which involves distributing a density value for a given voxel across voxels that overlap with the path of a motion vector for the given voxel. However, smearing can result in various problems, such as lost shading detail. Another approach involves introducing motion blur during rendering. For example, a motion vector can be assigned to each sample point of a lattice representing a volume to be rendered. The lattice is deformed according to the motion vectors, and when sampling values along rays through the lattice, a motion blur effect results from sampling randomly in time. However, storing vector-based motion information associated with each sample point can be computationally expensive at render time.

Therefore, it is desirable to provide new systems and methods for addressing such problems associated with simulating motion blur.

BRIEF SUMMARY

Embodiments can provide systems and methods for providing simulated motion blur in the computer animation of animated scenes. A first voxel array associated with a first voxel in a voxel grid of a three-dimensional model can be stored in memory by a processor. The first voxel array can include a plurality of time values. The first voxel array may include, for each time value, a parameter value of a parameter of an animated scene associated with the first voxel at the time value. A second voxel array associated with a second voxel in the voxel grid can also be stored in a memory by a processor. The second voxel array can include at least one time value. The second array may include, for the at least one time value, a parameter value of a parameter of the animated scene associated with the second voxel. At least one of the time values stored in the first voxel array may be different from each of the at least one time value included in the second voxel array.

Other embodiments are directed to systems, devices, and computer readable media associated with methods described herein.

BRIEF DESCRIPTION OF THE DRAWINGS

FIG. 1 is a diagram showing an illustrative scene in which a prior art vector-based approach to motion blur simulation is used.

DEFINITIONS

Figure 2B:
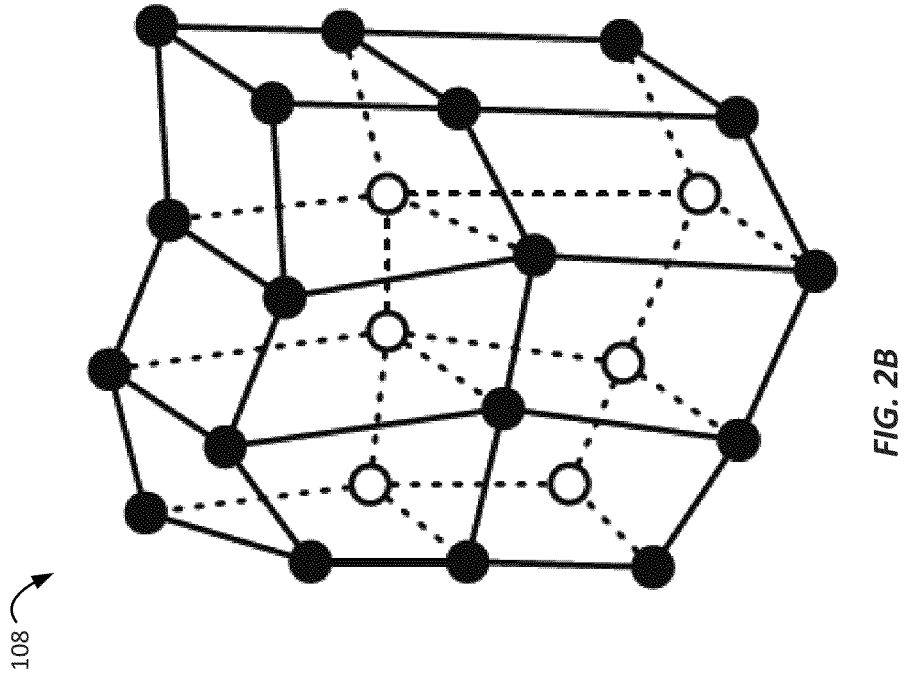
FIGS. 2A-2B are diagrams illustrating microvoxel lattice deformation according to a prior art vector-based approach to motion blur simulation.

An animated scene is a series of images (frames) as seen by a virtual movie camera (render camera) in a three-dimensional animated world. The frames are effectively obtained at successive times, e.g., as would be done for a physical camera. Rendering is the process for creating each image from the three-dimensional (3D) animated world and a current configuration of the virtual camera, e.g., using geometric and/or mathematical descriptions of objects in the 3D world.

A voxel is a volumetric element of a three-dimensional object to be rendered. The voxel may be identified by coordinates corresponding to the location of the voxel in space, such as three coordinates indication the position of the voxel in 3D space. Data indicating the appearance of the voxel, such as opacity, color, etc., may be stored in association with the voxel coordinates. The three-dimensional object may be an amorphous object, such as steam. For animation, an object may be represented as a set of voxels. Information related to the appearance of the object may be stored in association with each voxel of an object.

A temporal voxel buffer is a data structure that stores data in association with each voxel of voxel grid. The data associated with a voxel may be an array (i.e., a "voxel array") stored in computer memory. Each element of a voxel array may be one or more parameter values associated with a time value. A voxel array may store a time value in addition to the one or more parameter values for each array element. A voxel grid may be an orthogonal grid with evenly spaced congruent voxels. A subset of the voxels of the voxel grid may be referred to as a voxel subgrid.

A primitive is used to indicate the shape of an object. Primitives can include zero-dimensional, one-dimensional, two-dimensional and three-dimensional primitives, such as volumetric primitives, geometric primitives, and voxel buffers. A geometric primitive may be a point, a curve, a polygon, a surface, or other geometric object. A volumetric primitive may be a sphere, cylinder, rectangular prism, or other geometric volume.

A sampling lattice corresponds to a set of vertices associated with an object The sampling lattice may be used for rendering the object. For example, the vertices of a lattice may be used to determine how different points on the surface of the object should be shaded given the current configuration of the render camera. The number of vertices in a lattice corresponds to a resolution of the lattice, where more vertices correspond to a higher resolution. The vertices of the lattice may define polygons. The resolution of the object may change based on distance of the object from the render camera. The polygons at any given resolution can form a tessellation pattern. Different areas of an object may have different tessellation patterns (example of a lattice), such that different areas are represented with different resolutions. In some embodiments, a sampling lattice may be a microvoxel lattice. Where the term "microvoxel lattice" occurs below, it will be understood that any sampling lattice may be used.

The term "random" as used herein can refer to values obtained using a random number generator. Where a value is described as being random, it will be understood that pseudorandom values or multiple values may be used in lieu of random values.

DETAILED DESCRIPTION

Embodiments are directed to generating, storing and rendering temporal voxel data. A temporal voxel buffer is a data structure for storing parameter values in association with each voxel of a voxel grid. The voxel buffer may store parameter values and associated time values in voxel arrays. The change in parameters over time represents the change in the appearance of the voxel over time. The appearance of motion blur of an object represented by the voxel grid may be simulated using the change in the appearance of the voxels over time, as stored in the data of the temporal voxel buffer.

To populate a voxel grid data structure, the appearance of an object may be sampled at various times and locations. The shape of an object may be represented by one or more primitives, such as geometric shapes. A microvoxel lattice can be generated from the one or more primitives and a shader can be applied to the vertices of the microvoxel lattice. Whereas the microvoxel lattice may have an irregular shape, the voxel grid is typically an orthogonal arrangement of voxels. The voxel grid may overlap the microvoxel lattice, such that data sampled from the microvoxel lattice can be stored in association with voxels having readily determinable locations within the voxel grid. Parameter values such as density, color, etc., can be sampled at multiple times and multiple positions within the voxel grid (e.g., random times and random positions). The sampled parameter values and times may be stored in association with the voxels of the voxel grid. By using the stored values sampled from the microvoxel lattice at multiple times and multiple positions, a renderer can produce an image with a simulated effect of motion blur.

An animated scene may be rendered using one or more temporal voxel buffers. An object having an associated temporal voxel buffer may be among many objects to be rendered in a scene. For each pixel of the rendered image, a value of the pixel can be determined by casting rays through the volume. Raymarching is performed along the rays to obtain a value for a parameter associated with each ray. The parameter values for the plurality of rays associated with a pixel may be used to obtain the pixel value.

I. Introduction

Figure 3:
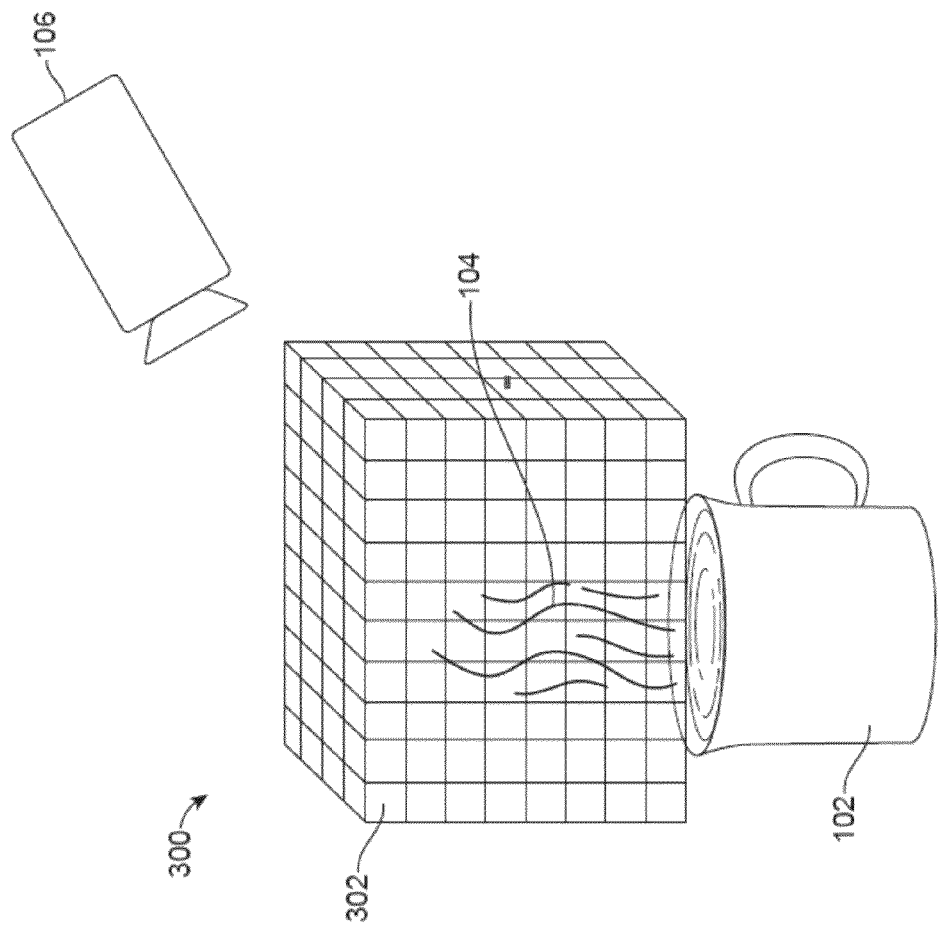
FIG. 3 is a diagram showing an illustrative scene in which a voxel grid may be used, in accordance with an embodiment.

FIGS. 1 and 3 together provide an example of a scene in which simulated motion blur may be desirable. The animated scene illustrated in FIGS. 1 and 3 includes steam hovering over a coffee cup. If the water particles of the steam move over the duration of a single "frame" of the animated scene, it may be desirable to show the particle with motion blur. Additionally, if the cup is moved, or if the background moves relative to the cup, it may be desirable to simulate motion blur for the motion of these image components.

Various data structures may be used to represent the shape and appearance of the objects in an image. Two approaches to data for representing changes in an image component over time are described below.

A. Prior Art Approach: Simulating Motion Blur using Motion Vectors

A prior technique to simulating motion blur involves associating motion vectors with vertices of a microvoxel lattice to indicate the motion of an object over time. A microvoxel lattice may be a three-dimensional arrangement of vertices representing the shape of an object. In a vector-based approach to motion blur simulation, each vertex of a microvoxel lattice may have an associated vector defining the motion of the vertex over time. At render time, the vertices of the lattice may be sampled at multiple times (e.g., randomly in time). The memory overhead of this approach is high, because the position of each vertex as it changes over time must be determined according to the vector associated with motion of each sample point.

FIG. 1 is a diagram showing an illustrative scene in which a prior art vector-based approach to motion blur simulation is used. In the illustrative example of FIG. 1, a coffee cup 102 and steam 104 are being captured from the perspective of virtual camera 106 to create an animated scene. Microvoxel lattice 108 can be used to represent the appearance of steam 104, such as the shape of the surface of a cloud of steam 104. Microvoxel lattice 108 includes vertices 110. It may be desirable to animate the motion of steam 104 using motion blur techniques. Vectors associated with the voxels can be used to indicate the motion of microvoxel lattice 108 over time.

Figure 2A:
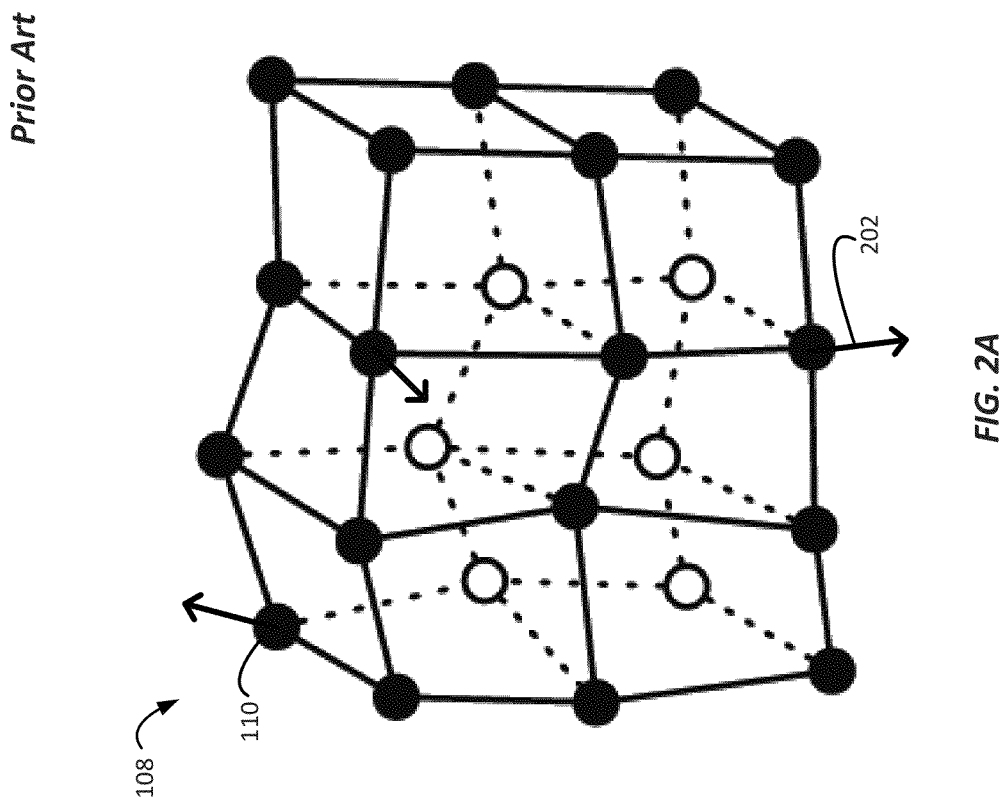

FIGS. 2A-2B are diagrams illustrating microvoxel lattice deformation according to a prior art vector-based approach to motion blur simulation. FIG. 2A shows a first state of a microvoxel lattice 108 and FIG. 2B shows a second state of the microvoxel lattice 108. For example, FIG. 2A may show the state of microvoxel lattice 108 at time t=0 and FIG. 2B may show the state of microvoxel lattice 110 at time t=1. Each vertex 110 of microvoxel lattice 108 has an associated vector 202, e.g., defining the movement of vertex 108 from t=0 to t=1. One or more parameters to define the appearance of the microvoxel lattice may be associated with each vertex 108. For example, a density value may be stored in association with each vertex. By sampling the values of the parameters associated with vertices 110 of microvoxel lattice 108 at multiple times between t=0 and t=1 (e.g., at random times between t=0 and t=1), the appearance of motion blur for an object associated with microvoxel lattice 108 may be simulated. The blur results from the changing shape of microvoxel lattice 110.

B. Simulating Motion Blur Using Temporal Voxel Buffer

As indicated above, motion blur may be simulated based on the variation in parameter values over time. The prior art approach described above determines variations using information about the motion of vertices 110 of microvoxel lattice 108. The temporal voxel buffer approach can simulate motion blur with stored information about how parameter values change over time, without requiring information about how a microvoxel lattice moves over time to be used at render time. Because the temporal voxel buffer can store predetermined values associated with a set of times for each voxel of a voxel grid, using a temporal voxel buffer for motion blur simulation places lower demands on processing and memory compared with prior art approaches. Additionally, the voxel grid typically has an orthogonal structure of congruent voxels, so the values of voxels within the voxel grid is more easily determined compared with the values of the moving vertices of a microvoxel lattice.

FIG. 3 is a diagram showing an illustrative scene in which a voxel grid 300 may be used, in accordance with an embodiment. Voxel grid 300 includes voxels 302. In the illustrative example of FIG. 1, coffee cup 102 and steam 104 are being captured from the perspective of virtual camera 106 to create an animated scene. Information about the appearance of the steam may be stored in association with voxels 302 of voxel grid 300. The information may include one or more parameters (e.g., density, color) associated with a time value. For example, for a particular voxel 402 (see FIG. 4), a series of density values may be stored corresponding to time values between time t=0 and t=1, where one frame of the animated scene is to be rendered at time t=0, and the next frame of the animated scene is to be rendered at t=1. The series of density values indicate how the density appearance of the voxel changes between t=0 and t=1. The information may be stored in computer memory using a temporal voxel data structure. In the illustrative example of FIG. 3, the temporal voxel buffer can be used to animate the motion of steam 106 using motion blur techniques.

II. The Temporal Voxel Buffer Data Structure

The temporal voxel buffer stores information about the change in appearance over time of an object, surface, or any other component of an animated scene. For example, a temporal voxel buffer can store information in association with voxels 302 of voxel grid 300 about how the appearance of steam 106 changes over time.

The temporal voxel buffer data structure may store information in association with a plurality of voxels. In some embodiments, the temporal voxel buffer data structure stores at least one array in association with each voxel of a voxel grid. The temporal voxel buffer data structure may additionally store an array of offset values (e.g., location in memory of data) for indicating the location of data associated with each voxel in storage (e.g., in storage in a function table). The temporal voxel data struture may be a tree, such as a single-level tree that stores data for groups of voxels. It will be recognized that alternative data structures may be used for storing voxel data in association with voxels of a voxel grid.

A. Voxel Data Compression

The data stored in the temporal voxel buffer can correspond to a change in a parameter (or in multiple parameters) over the time duration of a single frame of an animated sequence. A second temporal voxel buffer can be used to store data corresponding to a subsequent frame of the animated sequence, and so on. In some embodiments, data may be stored in association with a voxel for a time duration that is less than or greater to one frame.

When the variance in the appearance of a voxel is large, relatively more data points may need to be stored in the voxel array for the voxel. When the variance is small, fewer data points may be needed. A compression algorithm may be applied to the data points associated with a particular voxel so that a compressed representation of the data may be stored for the voxel.

Figure 4A:
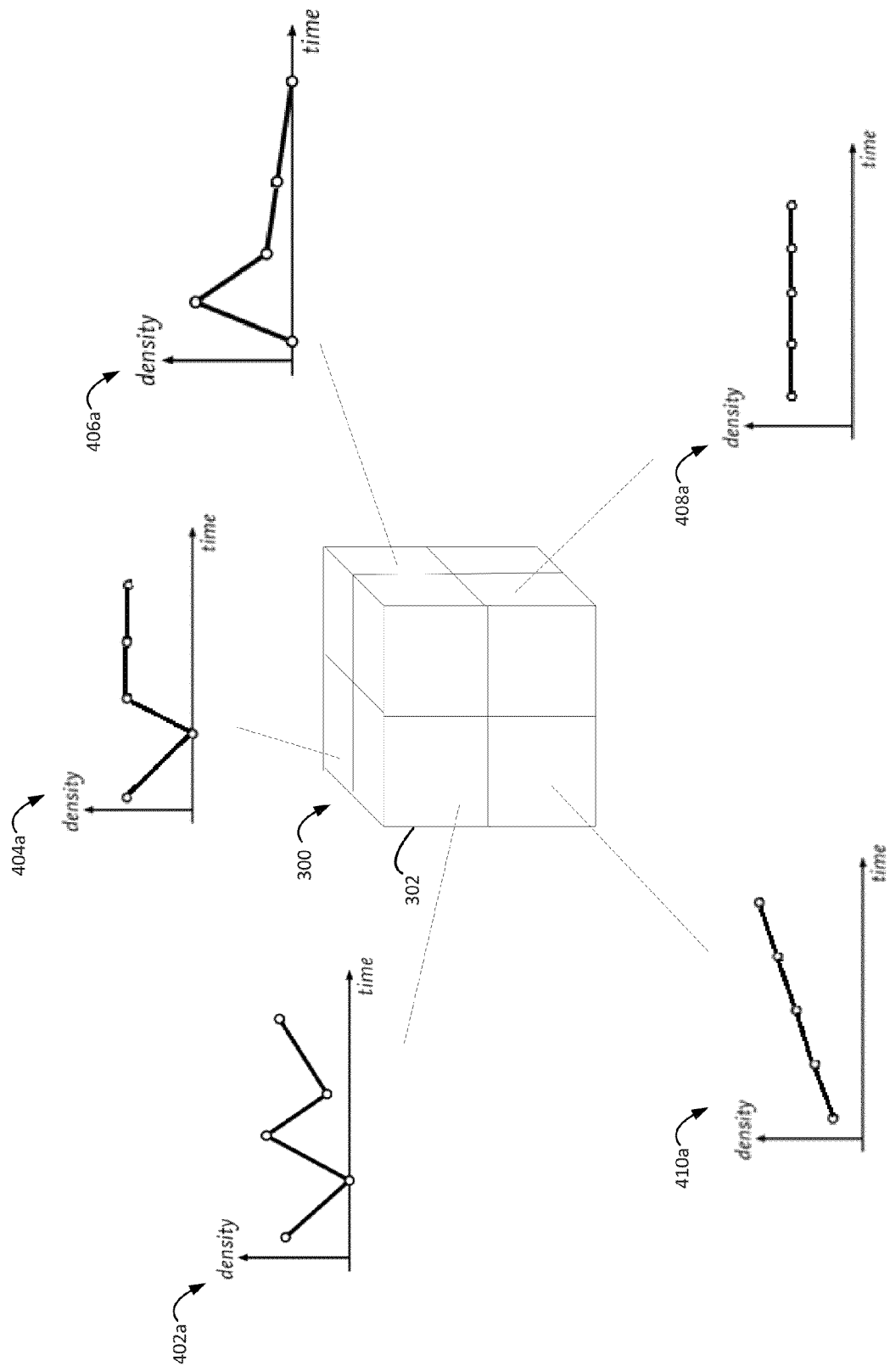
FIGS. 4A-4B are diagrams illustrating data associated with voxels of a voxel grid, according to an embodiment.

FIG. 4A is a diagram to illustrate uncompressed data associated with voxels of a voxel grid, according to an embodiment. The temporal voxel buffer stores data associated with each voxel 302 of voxel grid 300.

Graphs 402a-410a are illustrative examples of data that may be stored in association with voxels 302. Each graph 402a-410a shows the change in a density value over time for a particular voxel. For example, graph 402a shows the change in a density value for the voxel indicated at 402.

Figure 4B:
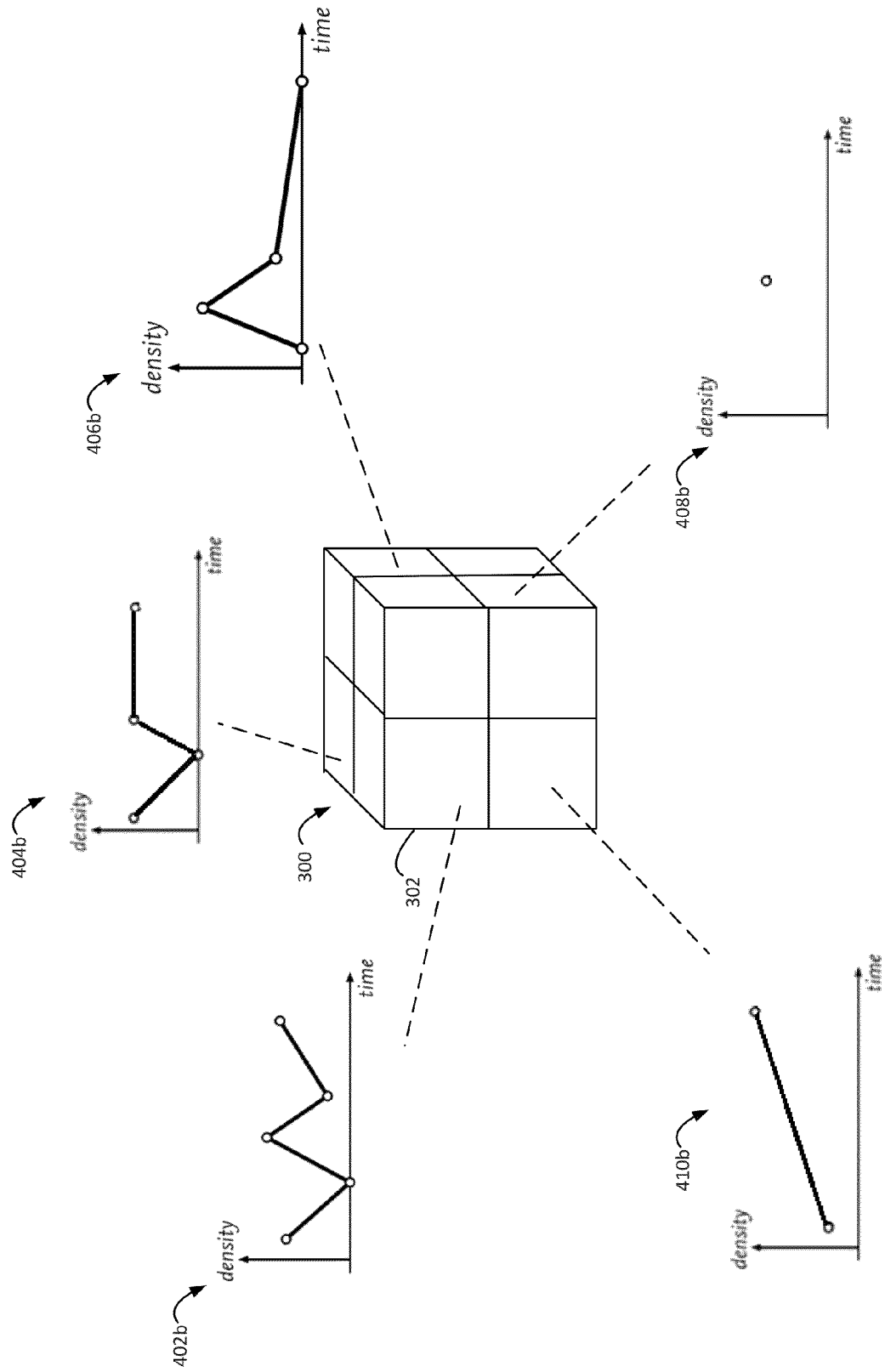

FIG. 4B is a diagram to illustrate compressed data associated with voxels of a voxel grid, according to an embodiment. Graphs 402b-410b are illustrative examples of compressed data that may be stored in association with voxels 302.

Compression may be applied to the data illustrated at 402a-410b of FIG. 4A to produce reduced data sets shown in the graphs illustrated at 402b-410b of FIG. 4B. For example, some of the graphs 402a-410a contain redundant data, e.g., graph 404a has the same density value at the last three data points of the graph. Because there is no variation in the appearance of the voxel between the last three data points, it may not be necessary to store a parameter value at each of these time intervals. The data of graph 404a may be compressed to obtain the data shown in graph 404b. For example, a compression algorithm may be applied to the data set shown in graph 404a to obtain a compressed data set shown in graph 404b. In this way, the amount of data stored in association with voxels 302 of voxel grid 300 may be reduced.

As another example, the data points of graph 410a are located along a line with a constant slope. It may not be necessary to store each of data points of 410a, as parameters at intermediate points along the line can be interpolated from data at the end points. Accordingly, the data of 410 may be compressed such that only the two points shown at 410b are stored.

Any compression algorithm may be used to reduce the amount of data stored in association with voxels 302. For example, lossy compression, spline-based compression, or other compression techniques may be used.

B. Voxel Arrays of the Voxel Buffer Data Structure

Figure 5:
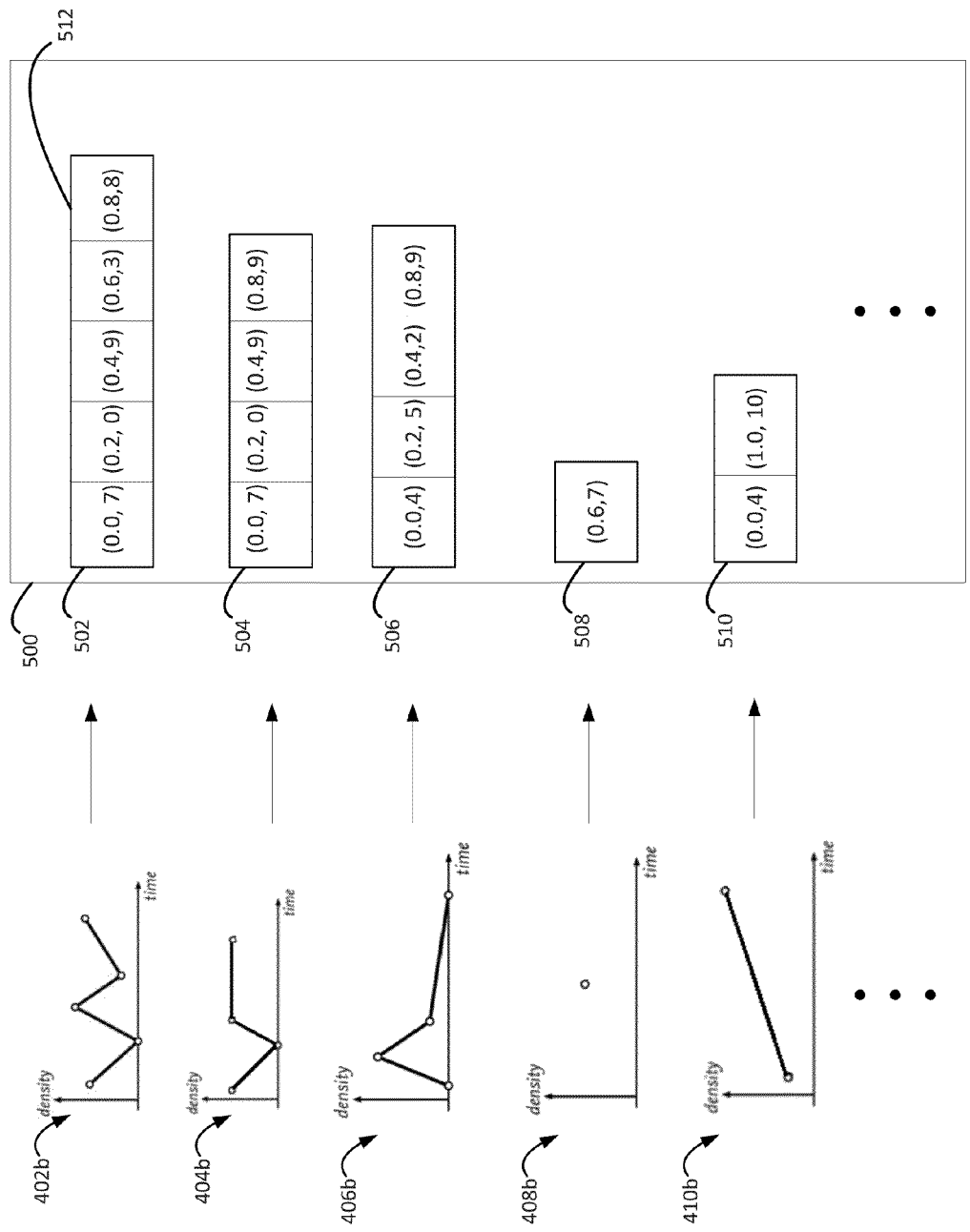
FIG. 5 is an illustrative diagram of a temporal voxel buffer data structure, according to an embodiment.

FIG. 5 is an illustrative diagram of a temporal voxel buffer data structure 500 according to an embodiment. In FIG. 5, the illustrative graphs 402b-410b of FIG. 4B are shown as voxel arrays 502-510. Temporal voxel buffer 500 includes one or more voxel arrays 502. As shown, temporal voxel buffer 500 corresponds to a change in a parameter value for a voxel grid during a frame of an animated scene.

As an example, temporal voxel buffer 500 may be a single-level tree that stores each voxel 302 of voxel grid 300. A voxel array 502 may be stored in association with each voxel 302 of voxel grid 300. If the appearance of a voxel does not change over time (e.g., over the duration of a frame), the block may store no data for the voxel, or a single parameter value may be stored for the voxel. For example, voxel array 508 stores a single parameter value, as the density value for this voxel does not change over the time period of the voxel buffer.

In some embodiments, the temporal voxel buffer may store an array of offset values in association with each voxel 302 of voxel grid 300. The array of offset values may indicate the location in memory of one or more parameter and/or time values for a voxel.

Voxel array 502 may be an array of one or more values stored in computer memory. A voxel array may be stored in association with voxel 402. For example, voxel buffer data structure 500 may store one or more values identifying a voxel 402 as corresponding to a stored voxel array 502, as may be done via a table. Alternatively, voxel array 502 may store information identifying a voxel, e.g., voxel array 502 may include a voxel identifier at the beginning or end of the data values. In some embodiments, a voxel 402 associated with a voxel array 502 can be identified based on the way in which voxel array 502 is stored in voxel buffer data structure 500, such as the location of voxel array 502 within voxel buffer data structure 500. For example, the voxels may be defined to have a particular order, and the corresponding voxel arrays can be stored in that same order. Any suitable indication of the beginning and end of a voxel array can be used to signify when the data corresponds to a new voxel.

Voxel array 502 can store one or more parameter values associated with a voxel 402. A parameter may be a characteristic of a voxel, such as a density, color, opacity, temperature, attenuation coefficient for a wavelength of light, etc. As indicated at graphs 402-410, the value of a parameter may vary over time for a voxel during a frame of an animated scene. Voxel array 502 can be used to store the change in a parameter, such as density, over the time of a frame for a particular voxel.

In some embodiments, voxel array 502 may be an associative array. For example, as shown in FIG. 5, voxel array 502 may store value pairs including a density value and a time value. Element 512 of array 502 corresponds to the last data point on graph 402, indicating that the density of voxel 302 has a magnitude value of 8 at time t=0.8.

Although the illustrative voxel arrays 502-510 of FIG. 5 are shown storing value pairs, it will be recognized that alternative voxel array structures may be used. For example, a voxel array 502 may not store time values in the elements of the array. If the voxel array does not store time values, the time value associated with an element may be determined based on, e.g., the location of the element within the array.

In some embodiments, multiple parameter values may be stored in each element of voxel array 502. For example, a density value, a color value, and a time value could be stored in each element of the array. In another embodiment, a voxel array may be a multidimensional array. For example, density values for a voxel 402 can be stored in a first row of a multidimensional array and time values associated with the density values can be stored in a second row of the multidimensional array. Additional parameter values may be stored in additional rows of the multidimensional array.

Voxel arrays may be nested within other arrays. For example, a voxel array could be nested within a voxel grid array for all voxels 302 of voxel grid 300. Data associated with a voxel 402 could be accessed by reading a voxel array from coordinates of the voxel grid array corresponding to coordinates of a voxel 402 within voxel grid 300.

Multiple arrays may be stored in association with each voxel 302. For example, where a set of parameters is available (e.g., sampled time/density value pairs), an array may be stored in association with a voxel indicating the offset within the set of parameters to the first parameter value (e.g., first time/density pair) for the voxel. Multiple arrays may be used to store parameter values for different parameters. For example, a density array, such as density array 502 may be stored in association with voxel 402, and a color array could also be stored in association with voxel 402, the color array indicating the change in color values over time for voxel 402.

As shown in temporal voxel buffer 500, voxel arrays 502-510 may store parameter values corresponding to a time range, e.g., from time t=0 to t=1. Although the illustrative voxel buffer 500 includes arrays with up to six time steps in the range t=0 to t=1, it will be recognized that other numbers of time steps may be used, such as 10 time steps over the range t=0 to t=1. The time duration of the voxel array may be related to the duration of a single frame. For example, if a frame has a duration of 1 unit of time (e.g., 1 unit of time could be equal to $\frac{1}{60}^{th}$ of a second, $\frac{1}{24}^{th}$ of a second, 1 second, or any other length of time), the voxel array may indicate changes in density from time t=0 to t=1. In other embodiments, the time duration of the voxel array may be shorter or longer than the duration of a frame. A second temporal voxel buffer may be used to store voxel arrays for each voxel in a time frame t=1 to t=2, and so on. Although a voxel array time range t=0 to t=1 is used for simplicity of presentation, it will be recognized that a time range t=0 to t=41.6 milliseconds or any other time range can be used for voxel arrays 502.

Voxel arrays may store parameter values at intervals of time over the range of time associated with voxels. For example, voxel array 502 stores a density value of 7 in association with time t=0.0, a density value of 0 in association with t=0.2, a density value of 9 in association with t=0.4, and so on, such that parameter values are stored at periodic intervals from t=0 to t=0.8.

Voxel array sizes may vary within a temporal voxel buffer 500. For example, as shown in FIG. 5, voxel array 510 has fewer elements than voxel array 502. Voxel array 510 corresponds to graph 408*b*, which is a compressed version of graph 408*a*. After data associated with a voxel of a voxel grid is sampled, e.g. to obtain the data illustrated in graph 408*a*, compression may be applied to the sampled data to obtain a compressed data set, as illustrated at graph 408*b*. In this way, the amount of data to be stored in voxel grid 502 may be reduced. In some embodiments, a compression algorithm may be applied to the parameter data associated with the voxels 302 of voxel grid 300 to reduce the amount of data stored by voxel arrays 502 of temporal voxel buffer 500.

As shown in FIG. 5, the distribution of time values may vary from one voxel array to another. For example, voxel array 506 has a distribution of time values including t=0.0, t=0.2, t=0.4 and t=0.8. Voxel array 510 has a distribution of time values including t=0.0 and t=1.0. The distribution of time values in voxel array 506 is different from the distribution of time values in voxel array 510. For example, time value t=0.2 is present in voxel array 506, but time value t=0.2 is not present in voxel array 510. In other words, voxel array 506 contains at least one value (t=0.2) that is different from each of the time values of voxel array 510.

C. Method

Figure 6:
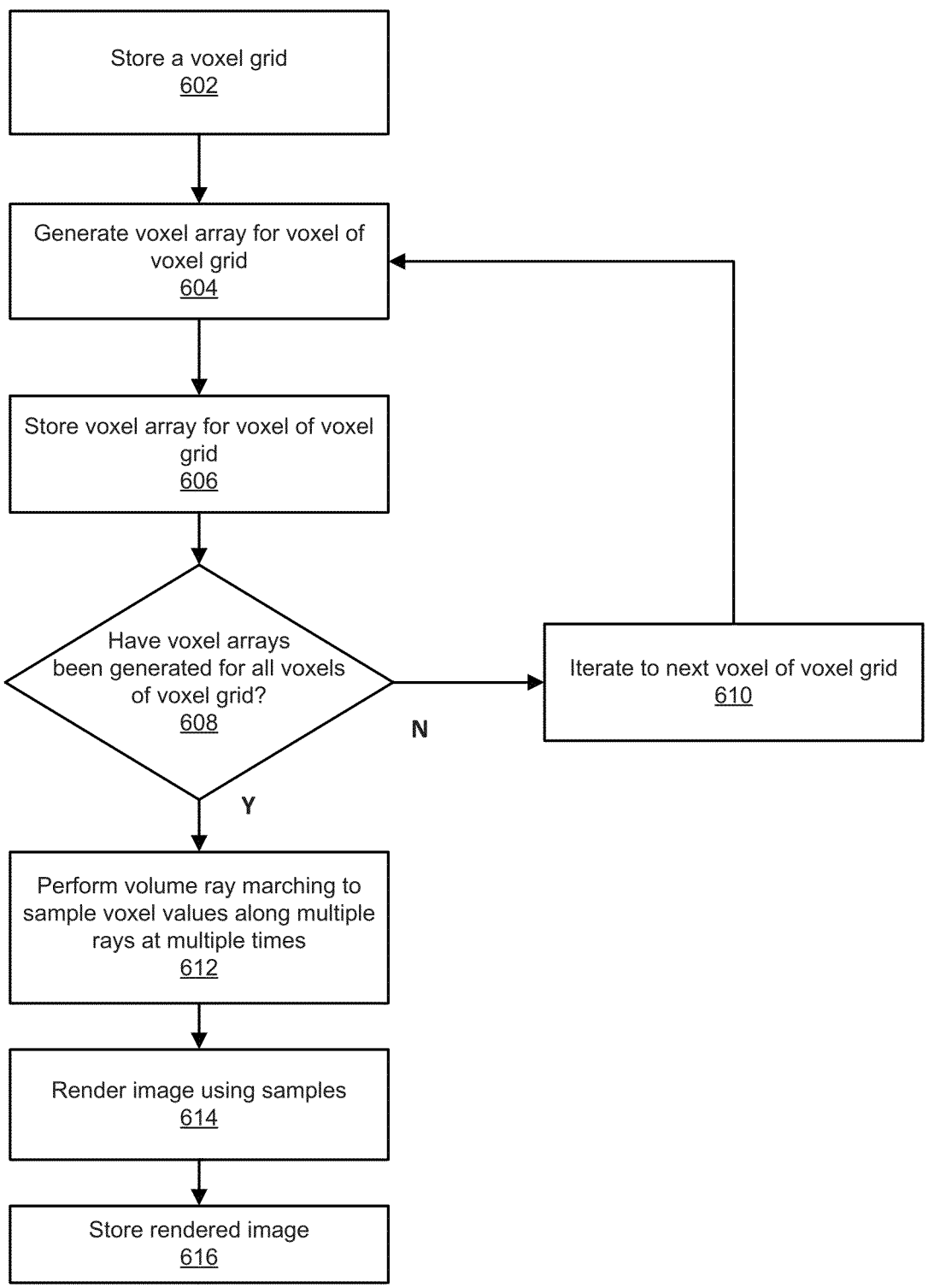
FIG. 6 is a flowchart for storing information in a temporal voxel buffer, according to an embodiment.

FIG. 6 is a flowchart for storing information in a temporal voxel buffer 500, according to an embodiment.

At operation 602, set of voxels 302, e.g., voxel grid 300, may be stored in computer memory. The voxel grid may be used to store data about the appearance of a component of an animated scene, such as an object in the scene (e.g., steam 104.)

At operation 604, a voxel array 502 may be generated for a voxel 402. For example, one or more parameter values may be sampled at a multiple points of time and at multiple positions within the voxel. The sampled values may be stored in association with the sample times in voxel arrays 502.

At operation 606, voxel array 502 may be stored in association with voxel 402.

At decision diamond 608, it may be determined whether voxel arrays have been generated for all voxels 302 in the set of voxels. If voxel arrays have not been stored for all of the voxels, a current voxel value may be iterated, as indicated at operation 610. A voxel array can then be generated and stored for the iterated voxel value, as indicated at operations 604-606.

At operation 612, volume ray marching may be performed for voxel grid 300 to obtain parameter values used in determining the value of each pixel of an image to be rendered. For example, for each pixel of an image, multiple rays may be cast such that the rays intersect the pixel and voxel grid 300. Each ray may have an associated time value. The time values may be random, and the point at which the ray enters voxel grid 300 may be random. The value of a parameter (or of multiple parameters, when multiple parameters are stored in association with a voxel) may be determined for each voxel along the ray at the time associated with the ray. The parameter values for the voxels along the ray may be combined using a rendering equation (e.g, composited) for each ray and an average value may be determined for the multiple rays. The average value may be assigned to the pixel, and the process may be repeated for each pixel of an image. The rendering process is described in more detail below.

At operation 614, an image may be rendered from the sample data for voxel grid 300. The value acquired as a result of operation 612 may be assigned to a pixel of an image. When values have been obtained for all of the pixels of an image, the image may be rendered according to the determined pixel values.

At operation 616, the image rendered at operation 614 may be stored, e.g., in computer memory, as a frame of an animated sequence. An animated sequence can be compiled from a series of stored rendered images.

In some embodiments, the data stored in temporal voxel buffer 500 may be generated using a rendering process, as described further below.

III. Generating Temporal Voxel Buffer Data

During a frame, the motion of an object can be modeled such that changes in the object can be determined at smaller time steps than the time interval between frames. The parameter values and time values associated with voxels 302 in temporal voxel buffer may be generated by applying a shader to a microvoxel lattice and sampling values of voxels of a voxel grid corresponding to the microvoxel lattice. For each voxel, samples may be obtained at multiple times and at multiple locations within the voxel during a frame. For example, a stochastic rasterization technique may be used, in which each voxel is sampled at random times and/or random locations within the voxel.

A. Method

Figure 7:
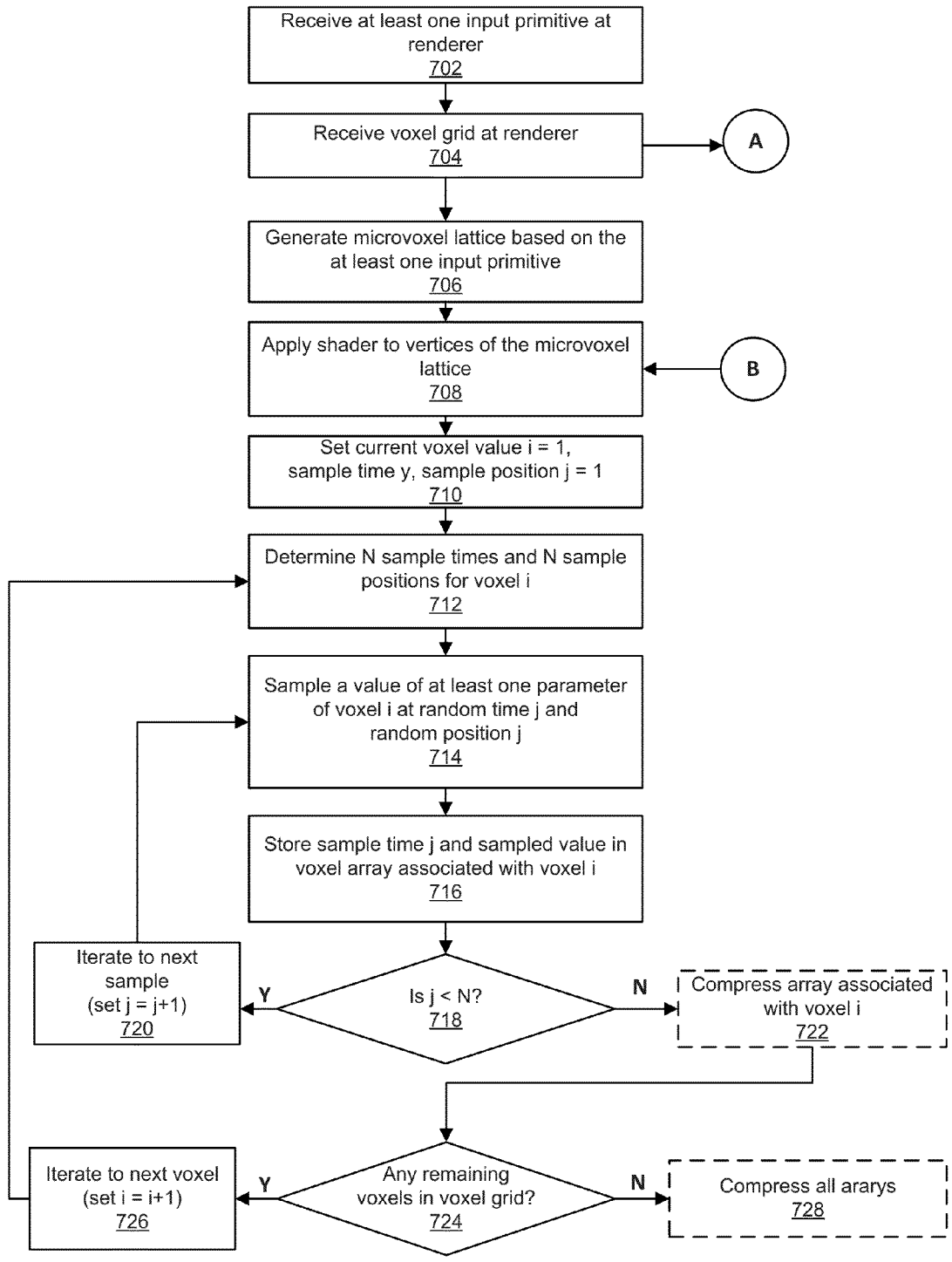
FIG. 7 is a flowchart for generating voxel buffer data to be stored in a temporal voxel buffer, according to an embodiment.

FIG. 7 is a flowchart of a method 700 for generating voxel buffer data to be stored in a temporal voxel buffer 500, according to an embodiment. Method 700 can be used to generate various voxel arrays of a voxel buffer. Different settings may be used, which can result in various voxel arrays, such as arrays of different length. The data itself can also result in voxel arrays of different length and time steps. Although described with respect to a shader, method 700 can use any routine that provides a property of an object.

At operation 702, at least one input primitive is received. The input primitive may be received by a software application or other program executed by a processor of a computer. In some embodiments, the software application may be a rendering application.

Figure 10A:
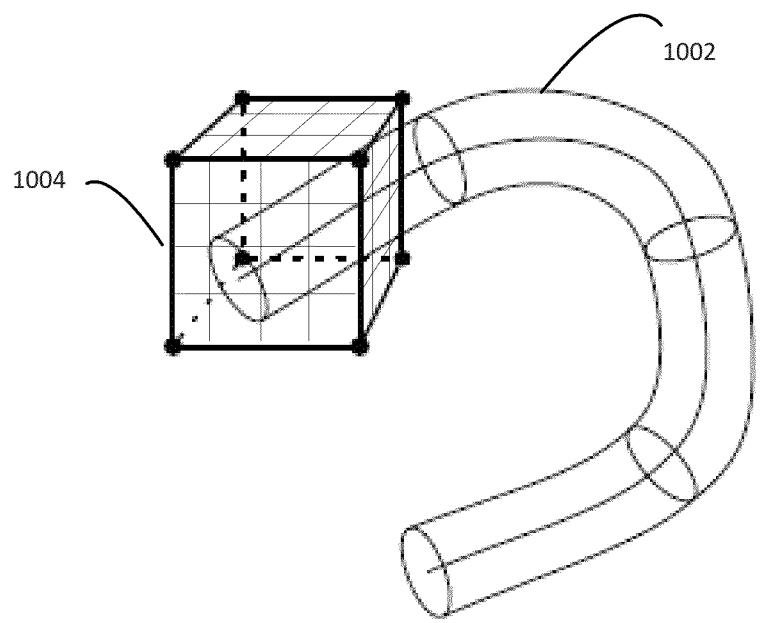
FIGS. 10A-10B show an input primitive relative to a voxel subgrid, according to an embodiment.
Figure 10B:
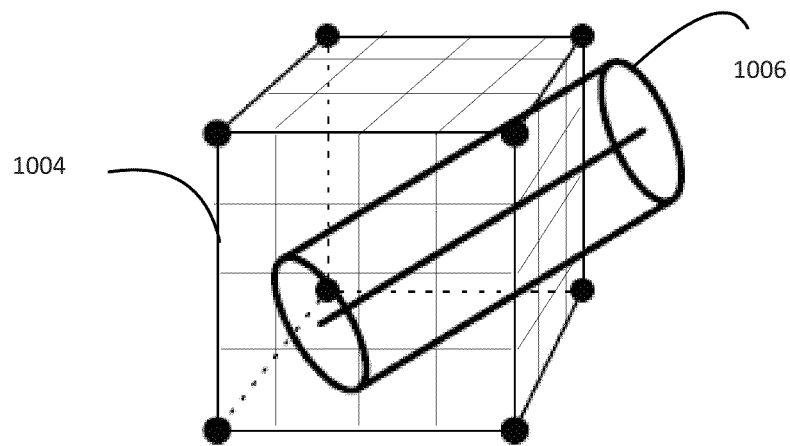

One or more primitives can be used to represent the shape of an object to be animated. For example, an input primitive could be a surface indicating the shape of steam 104. In another example, an input primitive could be volumetric primitive 1002 shown in FIG. 10. In a further example, an input primitive could be a previously generated temporal voxel buffer 500.

At operation 704, a voxel grid 300 may be received at the renderer. The size and position of voxel grid 300 may be automatically determined, or the size and position may be selected such that it partially or fully overlaps the area in which motion blur is desired relative to the input primitive.

At operation 706, a microvoxel lattice may be generated based on the at least one input primitive. In some embodiments, a microvoxel lattice may be generated according to a rendering approach as described in detail with reference to FIG. 8.

Figure 9A:
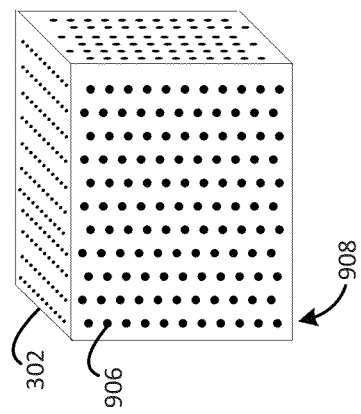
FIG. 9A shows an illustrative microvoxel lattice relative to a voxel grid, according to an embodiment.

FIG. 9A shows a microvoxel lattice 902 and a voxel grid 300, according to an embodiment. Typically, voxel grid 300 partially or fully overlaps, or is coterminous with, microvoxel lattice 902 such that values read from the shaded vertices of microvoxel lattice 902 can be stored in association with the voxel 402 of voxel grid 300 in which the vertex is located.

At operation 708 of FIG. 7, a shader may be applied to the vertices of the microvoxel lattice. A shader is an algorithm for calculating parameters that dictate the appearance of an object. For example, the shader could determine a density values for each vertex 904 of microvoxel lattice 902. Using the shader, parameter values may be determined at multiple time intervals over the duration of one frame of an animated sequence.

At operation 710, a variable may be initialized for iteration. For example, current voxel value i and sample time/sample position value j may be set to an initial value (e.g., 1).

At operation 712, multiple sample times and multiple sample positions (e.g., N sample time and N sample positions) are determined for voxel i. The N sample times and/or N sample positions may be determined, for example, using a random or pseudorandom process, such as a random number generator. For example, each sample time of the N sample times may be a random sample time in the range t=0 to t=1 for a particular frame of an animated sequence. Each sample position of the N sample positions may be a random position within voxel i. When the N sample times and N sample positions are determined, a minimum spacing between the sample times and/or minimum spacing between the N sample positions may be enforced.

Figure 9B:
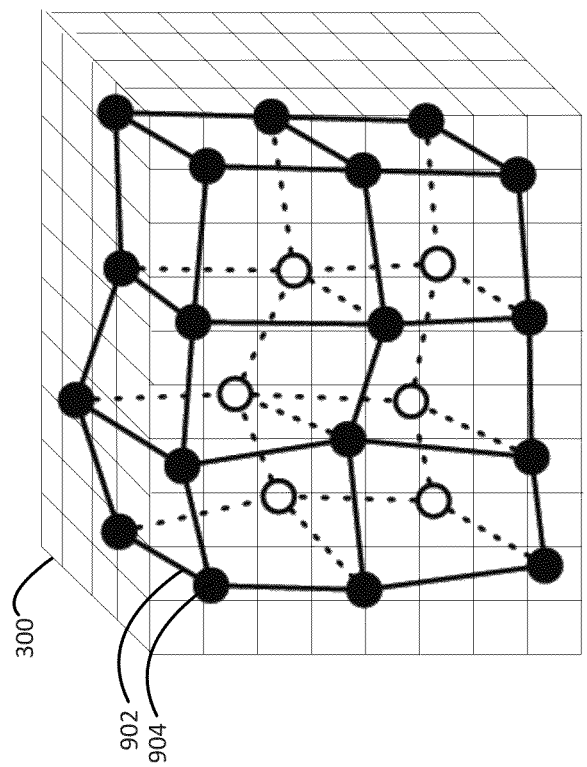
FIG. 9B shows illustrative sample positions within a voxel, according to an embodiment.

FIG. 9B shows illustrative sample positions 906 within a voxel 402. For example, voxel 402 may have 11×11×11 sample points, or 1331 sample points throughout the voxel.

The sample points may be arranged in offset rows 908, as shown in FIG. 9B. It will be recognized that other numbers and configurations of sample points could be used. N samples may be acquired for voxel 402, at multiple sample times and sample positions within voxel 402. For example, each of the N samples may be acquired for a random sample time and at random sample position 906 within voxel 402. In some embodiments, a sample may be acquired at the vertex of the microvoxel lattice that is closest to the sample point. Alternatively, the sample value may be an interpolation of the values of two or more lattices that are closest to the sample point.

In some embodiments, sample positions may be randomly determined microvoxel lattice points within a voxel. Alternatively, sample positions may be a randomly generated value in the coordinate system of a particular voxel.

Any number N samples corresponding to a voxel 402 may be acquired, e.g., 16 samples. The number of samples can also be random, potentially with a minimum number specified.

At operation 714, at least one parameter value of microvoxel lattice 902 is sampled at sample time j and sample position j within voxel i. For example, if vertex 904 is located within voxel i, one or more parameters from vertex 904 may be obtained. The parameters associated with the vertices of the microvoxel lattice may change over time, e.g., as the microvoxel lattice moves according to the motion vectors for its vertices.

At operation 716, the sample time and the parameter value (or parameter values) may be stored in memory. For example, a sample time and a parameter value may be stored in a voxel array 502 associated with voxel i.

At decision diamond 718, it is determined whether all of the N samples have been acquired, e.g., by determining whether sample value j is less than N. If j is less than N, sample value j is iterated, e.g., by setting j equal to j+1, as indicated at operation 720. If j is equal to N, the voxel array may be compressed, as indicated at optional operation 722. Compression of the voxel array of a voxel can result in storage of voxel array with fewer elements than the number of samples acquired for the voxel. For example, a compression algorithm can be applied to the N samples acquired for a voxel, such that one or more of the samples are deleted from the set of N samples acquired for the voxel. Voxel data compression is described in more detail below.

At decision diamond 724, it is determined whether voxel arrays 502 have been determined for all voxels 302 in voxel grid 300, by determining whether current voxel value i is equal to the number of voxels in the voxel grid. If voxels remain for which voxel arrays 502 have not been determined, current voxel value i is iterated, e.g., by setting i equal to i+1, as indicated at operation 726. In some embodiments, voxel array compression may occur after voxel arrays 502 have been determined for all voxels 302 in voxel grid 300, as indicated at optional operation 728. Voxel data compression is described in more detail above.

At A of FIG. 7, a microvoxel lattice 902 may be generated from the input primitive according to the operations described with reference to FIG. 8.

B. Microvoxel Lattice Generation

Figure 8:
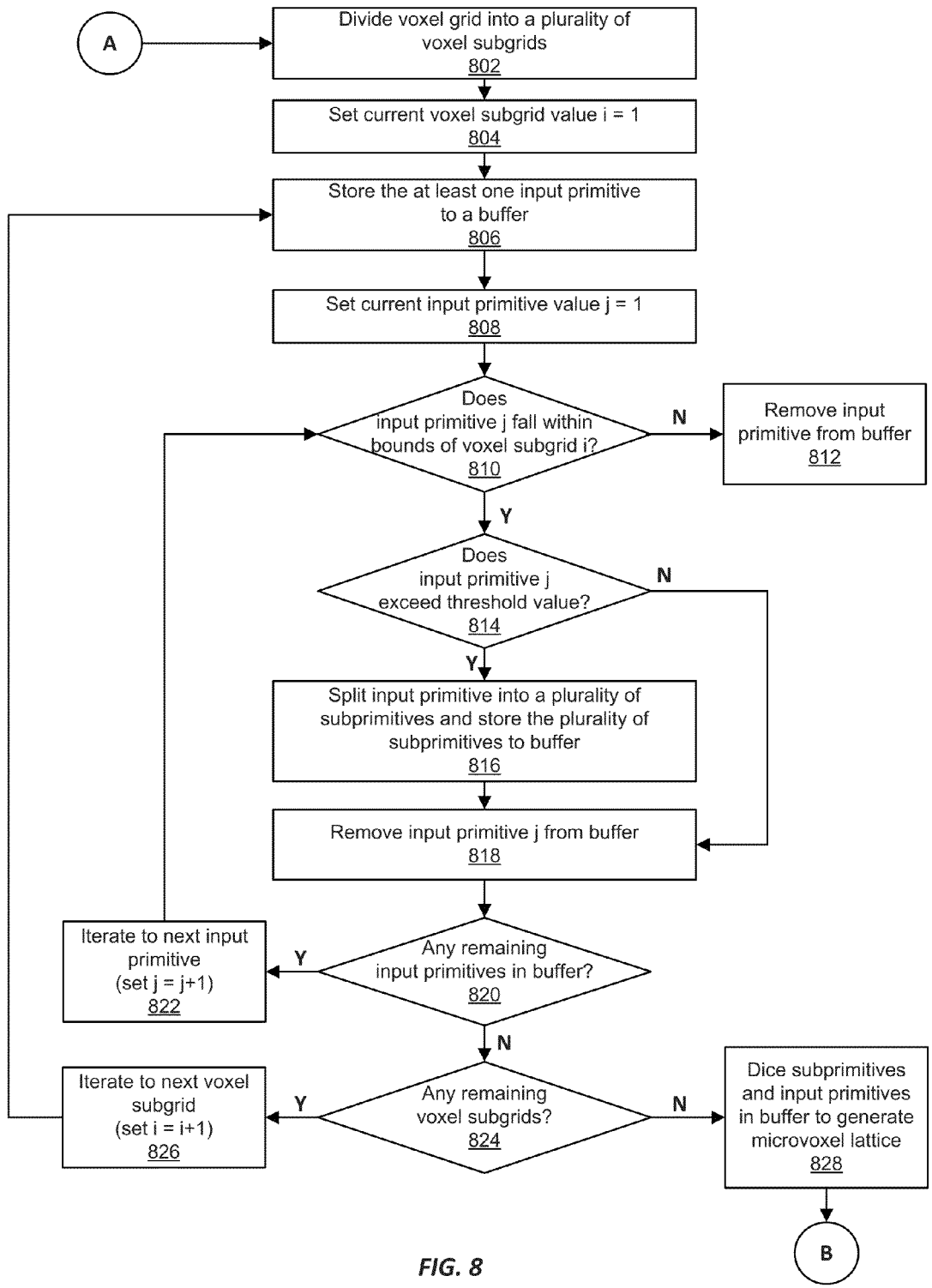
FIG. 8 is a flowchart for generating a microvoxel lattice, according to an embodiment.

FIG. 8 is a flowchart for generating a microvoxel lattice 902, according to an embodiment.

At operation 802, voxel grid 300 is divided into voxel subgrids. Voxel subgrids include a subset of the voxels 302 of voxel grid 300. An example of a voxel subgrid is shown at 1004 of FIG. 10A.

At operation 804, current voxel subgrid value i is set to an initial value (e.g., 1).

At operation 806, the at least one input primitive (e.g., input primitive 1002 shown in FIG. 10A) received at operation 702 is stored to an input primitive buffer. At operation 808, current input primitive value j is set to an initial value (e.g., 1).

At decision diamond 810, it is determined whether input primitive j falls within the bounds of voxel subgrid i. An input primitive may fall within the bounds of a voxel subgrid even if the input primitive is only partially within the extents of the voxel subgrid. By way of example, referring to FIG. 10A, input primitive 1002 is (partially) located within the extents of the voxels of voxel subgrid 1004. Accordingly, at operation 808, it would be determined that input primitive 1002 falls within the bounds of voxel subgrid 1004.

At operation 812 of FIG. 8, if input primitive j does not fall within the bounds of voxel subgrid j, input primitive j is removed from the input primitive buffer.

At decision diamond 814, if input primitive j does fall within the bounds of voxel subgrid i, it is determined whether input primitive j exceeds a threshold value. For example, it may be determined whether a length, width, both length and width, or other dimension (or combination of dimensions) exceeds a distance threshold value, such as a distance specified in pixels. The threshold value may be a predetermined, automatically determined, or user configurable value of the rendering program.

At operation 816, if input primitive j exceeds the threshold value, the input primitive may be split into two or more subprimitives. For example, referring to FIGS. 10A and 10B, input primitive 1002 exceeds a threshold length, and is split into four subprimitives, including subprimitive 1006 shown in FIG. 10B. The two or more subprimitives may be stored to the input primitive buffer, i.e., for further processing. At operation 818, if input primitive j does not exceed the threshold value, input, input primitive j may be removed from the input primitive buffer.

At decision diamond 820, it is determined whether any input primitives remain in the input primitive buffer. If input primitives remain in the input primitive buffer, the current input primitive value j is iterated, as indicated at operation 822, so that the next current input primitive can be handled at operations 810-818. At operation 824, it is determined whether any voxel subgrids remain to be handled, i.e., whether current voxel subgrid value i is less than the total number of voxel subgrids. If there are remaining voxel subgrids, the current voxel subgrid value i is iterated, as indicated at operation 826, so that the next voxel subgrid can be handled at operations 806-820. If there are no remaining voxel subgrids, i.e., current voxel subgrid value i is equal to the total number of voxel subgrids, all subprimitives and all unsplit input primitives (i.e., input primitives not split at 814-816) are diced, as indicated at operation 828.

Dicing an input primitive creates a microvoxel lattice 902 from an input primitive. For example, dicing may decompose a primitive into smaller polygons. Many conventional techniques may be used to dice the object, for example, dicing may divide the object into triangles, four-sided polygons, and the like. Intersection points of the polygons can form a lattice, or the resulting polygons can be considered a lattice. As examples, these points can be used for shading and shape representation. The polygons can be smaller than a pixel, and thus may be subpixel-sized micropolygons. Each polygon may be tested for visibility and used to make a pixel (via sampling and filtering steps).

At B of FIG. 8, the flow may proceed to operation 708 of FIG. 7.

C. Advection Approach to Voxel Buffer Generation

In some embodiments, an advection technique may be used to populate a temporal voxel buffer. The advection approach determines parameter values associated with voxels by sampling values from a fluid simulation field rather than sampling values from a microvoxel grid. For example, steam 104 may be represented by a fluid simulation field. A voxel grid 300 may be generated corresponding to (e.g., containing) the fluid simulation field. For each voxel 302 of voxel grid 300, a parameter value may be determined at a sample position and a sample time. In some embodiments, parameter values are determined at multiple sample positions and multiple sample times. The sample positions and sample times may be determined randomly, pseudorandomly, or according to another process. For example, the sample position may be a random position within a voxel, as illustrated at FIG. 9B. Alternatively, the sample position may be a randomly generated value in the coordinate system of a particular voxel. In an illustrative example, to determine a parameter value corresponding to a sample time t=0.5, a state could be determined for the sample position from the fluid simulation field at t=0.3 and at t=0.6. The sample parameter value at t=0.5 can be determined based on an interpolation between the parameter values t=0.3 and t=0.6. Voxel arrays 502 of temporal voxel buffer 500 may be populated applying this advection technique to each voxel at multiple sample times and sample positions within the voxel.

After a temporal voxel buffer is populated, e.g., using one or more of the techniques described above, the temporal voxel buffer may be used for rendering an image.

IV. Rendering with the Temporal Voxel Buffer

A motion blur effect can be simulated in a process for rendering an image using a temporal voxel buffer data structure. In some embodiments, a raymarching approach to rendering may be used. Rendering with raymarching involves casting rays such that the rays intersect a pixel and the voxel grid corresponding to the temporal voxel buffer. The rays may be random in time and random in direction. The value of a parameter (or of multiple parameters) of the voxels along the ray at the time associated with the ray may be composited along the ray. The parameter values may be averaged across the multiple rays to generate an average value for the parameter. This value may be used to determine one or more values corresponding to a pixel of an image. The image may be a frame of an animated sequence.

Figure 11:
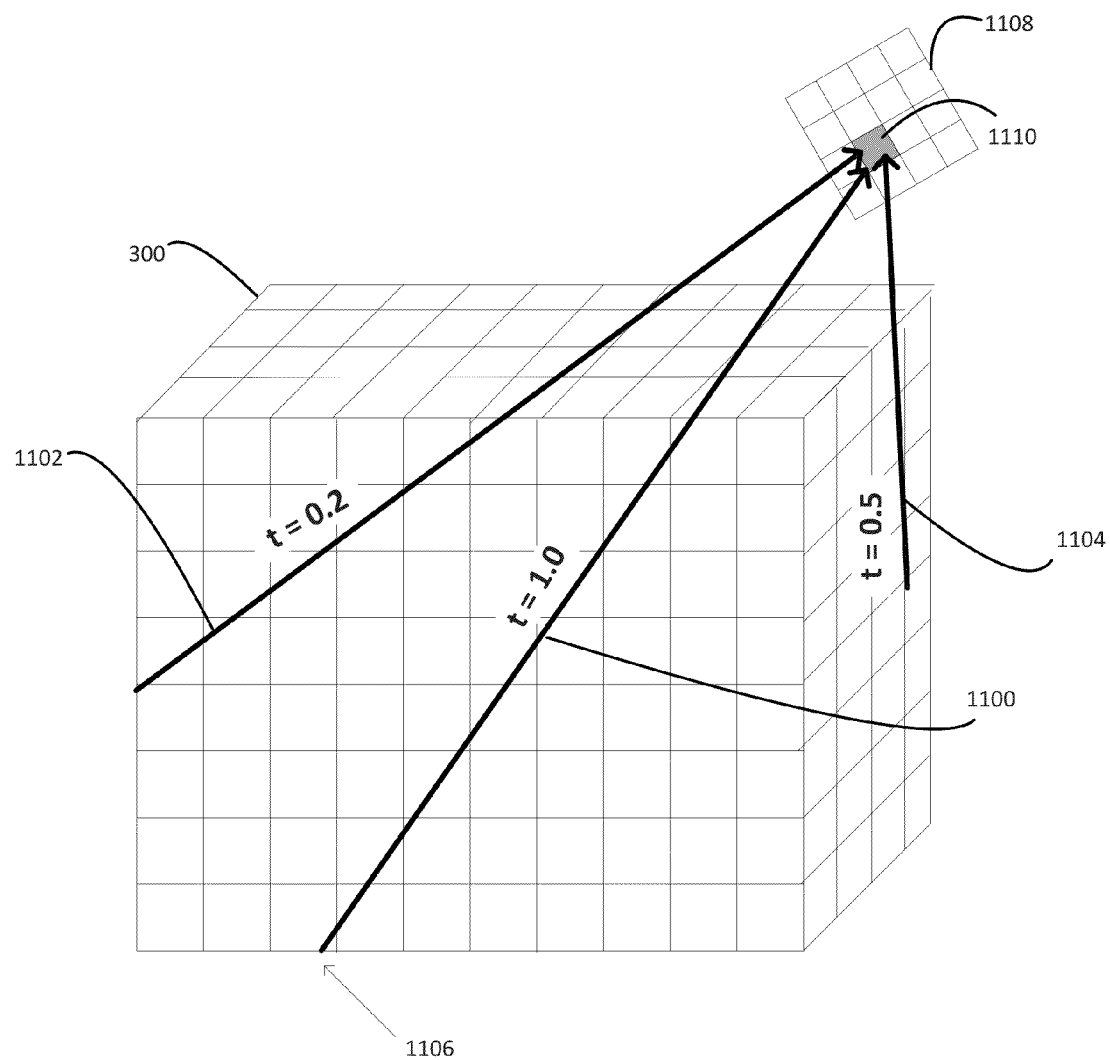
FIG. 11 is a diagram showing illustrative rays cast through a volume for use in rendering.

FIG. 11 is a diagram showing illustrative rays cast through a volume for use in rendering. Ray 1100 is typically one of a plurality of rays (e.g., rays 1100-1104) cast through voxel grid 300. Ray 1100 may be defined by the location of a pixel of an image to be rendered, and the point at which the ray enters voxel grid 300, e.g., entry point 1106. An illustrative image to be rendered is shown at 1108. Image 1108 includes a plurality of pixels 1110. Rays 1100-1104 correspond to pixel 1110.

A plurality of rays 1100-1104 are cast through voxel grid 300 to arrive at pixel 1110. The multiple rays are cast at multiple times and in multiple directions. For example, in the illustrative example of FIG. 11, ray 1102 is cast at time t=0.2 in a first direction, ray 1104 is cast at time t=1.0 in a second direction, and ray 1106 is cast at time t=0.5 in a third direction. The direction of each ray 1100 and the time associated with each ray 1100 may be determined randomly, pseudorandomly, or by another process.

Figure 12:
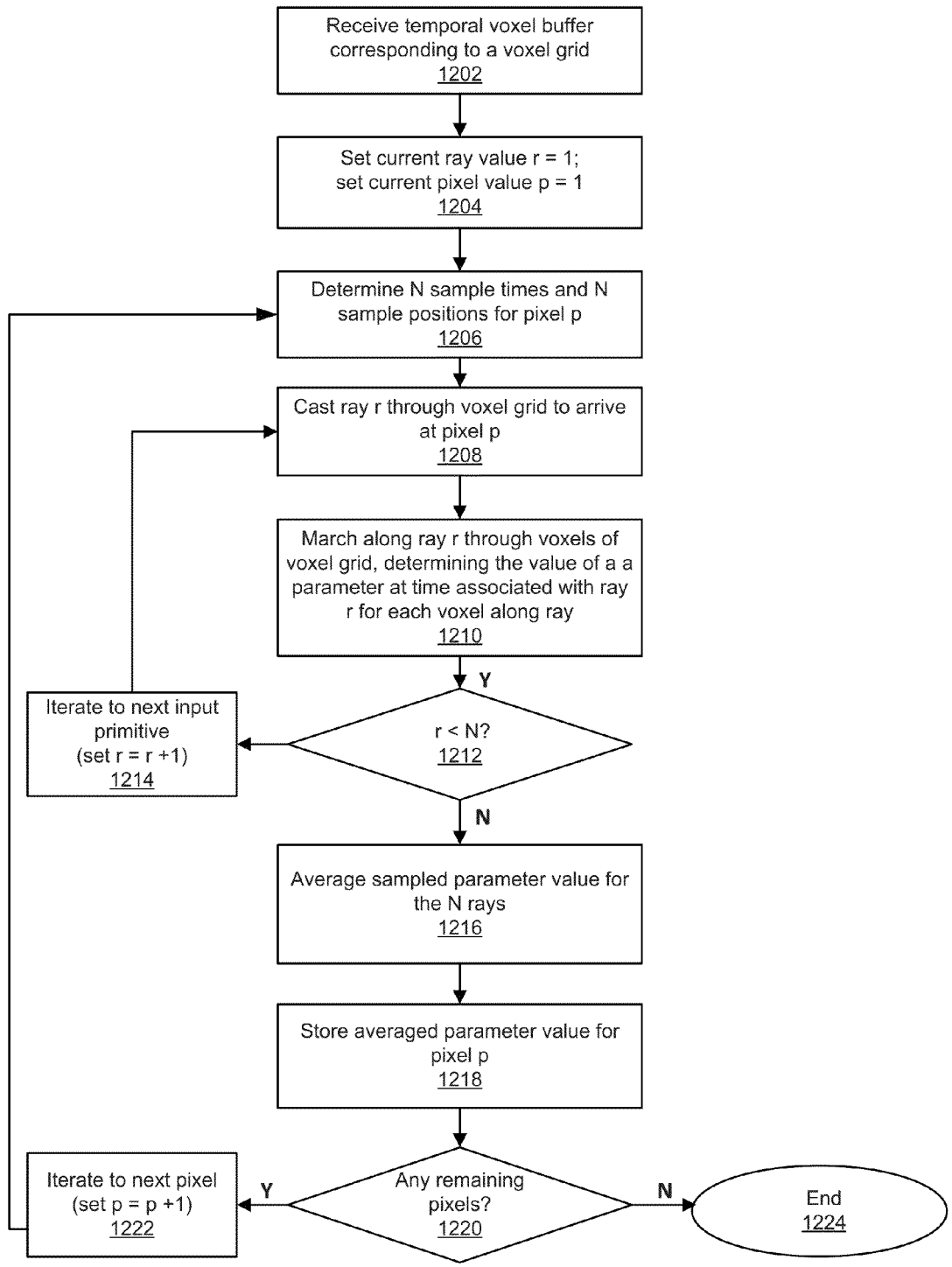
FIG. 12 is a flowchart for rendering an image using a temporal voxel buffer.

FIG. 12 is a flowchart for rendering an image using a temporal voxel buffer, according to embodiments of the present invention. To render an image using a temporal voxel buffer, data from the temporal voxel buffer associated with a voxel grid is read along rays cast through the voxel grid, as shown in FIG. 11.

At operation 1202, a temporal voxel buffer 500 associated with voxel grid 300 is received. The temporal voxel buffer 500 may be received by a software application, such as a rendering application. At operation 1206, current ray value r is set to an initial value and current pixel value p is set to an initial value.

At operation 1206, multiple sample times and multiple sample position (e.g., N sample times and N sample positions of entry into a voxel grid) are determined for pixel p. The N sample times and N sample positions may be determined, for example, using a random or pseudorandom process, such as a random number generator. For example, each sample time of the N sample times may be a random sample time in the range t=0 to t=1 for a particular frame of an animated sequence. Each sample position of the N sample positions may be an entry point (e.g., 1106) of voxel grid 300. Any number N samples may be acquired in this manner. When the N sample times and N sample positions are determined, a minimum spacing between the sample times and/or minimum spacing between the N sample positions may be enforced.

At operation 1208, current ray r (e.g., ray 1100) is cast through voxel grid 300 to arrive at current pixel p. Ray r may have a random sample time and a random entry point 1106 into voxel grid 300.

At operation 1210, ray marching is performed for current ray r. For example, the value of a parameter may be obtained for each voxel along the path ray r takes through voxel grid 300 at the time associated with ray r at the time associated with time r. In some embodiments, the value of multiple parameters may be obtained for each voxel along the ray. The value of a parameter associated with a voxel along ray r at time t can be obtained from the voxel array 502 that is stored in association with the voxel in temporal voxel buffer 500. The values of a parameter along a ray may combined. For example, the values along the ray may be averaged, or may be composited, e.g. by applying a rendering algorithm to the parameter values along the ray.

At operation 1212, it is determined whether ray marching has been performed for all N rays, i.e., it is determined whether current ray value r is less than N. If ray marching has not been performed for all N rays, current ray value r is iterated, as indicated at operation 1214, so that ray marching may be performed for the next ray at operations 1208-1210.

If ray marching has been performed for all N rays, the flow may proceed to operation 1216. In some embodiments, an average value across the N rays can be determined from the composite values, as indicated at operation 1216. As this average value depends on changes during a frame, the average value can capture effects of motion blur. The value determined from ray marching at operations 1208-1216 may be stored in association with pixel p, as indicated at operation 1218.

At operation 1220, it is determined whether ray marching has been performed for all p pixels. If ray marching has not been performed for pixels, current pixel value p is iterated, as indicated at operation 1222, so that ray marching may be performed for N rays at the next pixel at operations 1206-1218. If ray marching has been performed for all pixels, the flow ends, as indicated at 1224.

When pixel values have been assigned for all of the pixels of an image, a frame of an animated scene has been rendered.

V. System

Figure 13:
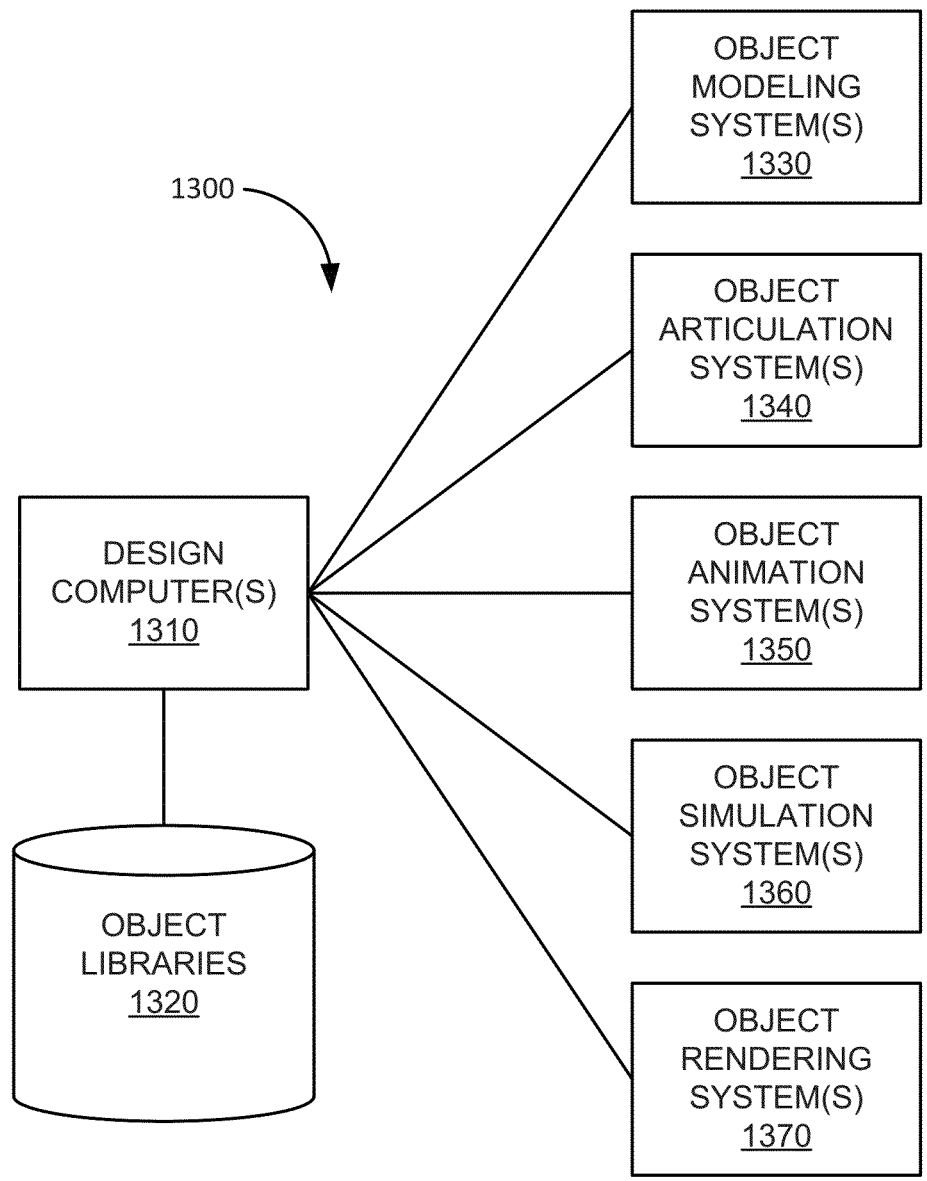
FIG. 13 is a simplified block diagram of a system for creating computer graphics imagery (CGI) and computer-aided animation that may implement or incorporate various embodiments.

FIG. 13 is a simplified block diagram of system 1300 for creating computer graphics imagery (CGI) and computer-aided animation that may implement or incorporate various embodiments. In this example, system 1300 can include one or more design computers 1310, one or more object libraries 1320, one or more object modeling systems 1330, one or more object articulation systems 1340, one or more object animation systems 1350, one or more object simulation systems 1360, and one or more object rendering systems 1370. Any of the systems 1330-1370 may be invoked by or used directly by a user of the one or more design computers 1310 and/or automatically invoked by or used by one or more processes associated with the one or more design computers 1310. Any of the elements of system 1300 can include hardware and/or software elements configured for specific functions.

The one or more design computers 1310 can include hardware and software elements configured for designing CGI and assisting with computer-aided animation. Each of the one or more design computers 1310 may be embodied as a single computing device or a set of one or more computing devices. Some examples of computing devices are PCs, laptops, workstations, mainframes, cluster computing system, grid computing systems, cloud computing systems, embedded devices, computer graphics devices, gaming devices and consoles, consumer electronic devices having programmable processors, or the like. The one or more design computers 1310 may be used at various stages of a production process (e.g., pre-production, designing, creating, editing, simulating, animating, rendering, post-production, etc.) to produce images, image sequences, motion pictures, video, audio, or associated effects related to CGI and animation.

In one example, a user of the one or more design computers 110 acting as a modeler may employ one or more systems or tools to design, create, or modify objects within a computer-generated scene. The modeler may use modeling software to sculpt and refine a neutral 3D model to fit predefined aesthetic needs of one or more character designers. The modeler may design and maintain a modeling topology conducive to a storyboarded range of deformations. In another example, a user of the one or more design computers 1310 acting as an articulator may employ one or more systems or tools to design, create, or modify controls or animation variables (avars) of models. In general, rigging is a process of giving an object, such as a character model, controls for movement, therein "articulating" its ranges of motion. The articulator may work closely with one or more animators in rig building to provide and refine an articulation of the full range of expressions and body movement needed to support a character's acting range in an animation. In a further example, a user of design computer 1310 acting as an animator may employ one or more systems or tools to specify motion and position of one or more objects over time to produce an animation.

Object library 1320 can include elements configured for storing and accessing information related to objects used by the one or more design computers 1310 during the various stages of a production process to produce CGI and animation. Some examples of object library 1320 can include a file, a database, or other storage devices and mechanisms. Object library 1320 may be locally accessible to the one or more design computers 1310 or hosted by one or more external computer systems.

Some examples of information stored in object library 1320 can include an object itself, metadata, object geometry, object topology, rigging, control data, animation data, animation cues, simulation data, texture data, lighting data, shader code, or the like. An object stored in object library 120 can include any entity that has an n-dimensional (e.g., 2D or 3D) surface geometry. The shape of the object can include a set of points or locations in space (e.g., object space) that make up the object's surface. Topology of an object can include the connectivity of the surface of the object (e.g., the genus or number of holes in an object) or the vertex/edge/face connectivity of an object.

The one or more object modeling systems 1330 can include hardware and/or software elements configured for modeling one or more objects. Modeling can include the creating, sculpting, and editing of an object. In various embodiments, the one or more object modeling systems 1330 may be configured to generated a model to include a description of the shape of an object. The one or more object modeling systems 1330 can be configured to facilitate the creation and/or editing of features, such as non-uniform rational B-splines or NURBS, polygons and subdivision surfaces (or SubDivs), that may be used to describe the shape of an object. In general, polygons are a widely used model medium due to their relative stability and functionality. Polygons can also act as the bridge between NURBS and SubDivs. NURBS are used mainly for their ready-smooth appearance and generally respond well to deformations. SubDivs are a combination of both NURBS and polygons representing a smooth surface via the specification of a coarser piecewise linear polygon mesh. A single object may have several different models that describe its shape.

The one or more object modeling systems 1330 may further generate model data (e.g., 2D and 3D model data) for use by other elements of system 1300 or that can be stored in object library 1320. The one or more object modeling systems 1330 may be configured to allow a user to associate additional information, metadata, color, lighting, rigging, controls, or the like, with all or a portion of the generated model data.

The one or more object articulation systems 1340 can include hardware and/or software elements configured to articulating one or more computer-generated objects. Articulation can include the building or creation of rigs, the rigging of an object, and the editing of rigging. In various embodiments, the one or more articulation systems 1340 can be configured to enable the specification of rigging for an object, such as for internal skeletal structures or eternal features, and to define how input motion deforms the object. One technique is called "skeletal animation," in which a character can be represented in at least two parts: a surface representation used to draw the character (called the skin) and a hierarchical set of bones used for animation (called the skeleton).

The one or more object articulation systems 1340 may further generate articulation data (e.g., data associated with controls or animations variables) for use by other elements of system 1300 or that can be stored in object library 1320. The one or more object articulation systems 1340 may be configured to allow a user to associate additional information, metadata, color, lighting, rigging, controls, or the like, with all or a portion of the generated articulation data.

The one or more object animation systems 1350 can include hardware and/or software elements configured for animating one or more computer-generated objects. Animation can include the specification of motion and position of an object over time. The one or more object animation systems 1350 may be invoked by or used directly by a user of the one or more design computers 1310 and/or automatically invoked by or used by one or more processes associated with the one or more design computers 1310.

In various embodiments, the one or more animation systems 1350 may be configured to enable users to manipulate controls or animation variables or utilized character rigging to specify one or more key frames of animation sequence. The one or more animation systems 1350 generate intermediary frames based on the one or more key frames. In some embodiments, the one or more animation systems 1350 may be configured to enable users to specify animation cues, paths, or the like according to one or more predefined sequences. The one or more animation systems 1350 generate frames of the animation based on the animation cues or paths. In further embodiments, the one or more animation systems 1350 may be configured to enable users to define animations using one or more animation languages, morphs, deformations, or the like.

The one or more object animations systems 1350 may further generate animation data (e.g., inputs associated with controls or animations variables) for use by other elements of system 1300 or that can be stored in object library 1320. The one or more object animations systems 1350 may be configured to allow a user to associate additional information, metadata, color, lighting, rigging, controls, or the like, with all or a portion of the generated animation data.

The one or more object simulation systems 160 can include hardware and/or software elements configured for simulating one or more computer-generated objects. Simulation can include determining motion and position of an object over time in response to one or more simulated forces or conditions. The one or more object simulation systems 1360 may be invoked by or used directly by a user of the one or more design computers 1310 and/or automatically invoked by or used by one or more processes associated with the one or more design computers 1310.

In various embodiments, the one or more object simulation systems 1360 may be configured to enables users to create, define, or edit simulation engines, such as a physics engine or physics processing unit (PPU/GPGPU) using one or more physically-based numerical techniques. In general, a physics engine can include a computer program that simulates one or more physics models (e.g., a Newtonian physics model), using variables such as mass, velocity, friction, wind resistance, or the like. The physics engine may simulate and predict effects under different conditions that would approximate what happens to an object according to the physics model. The one or more object simulation systems 1360 may be used to simulate the behavior of objects, such as hair, fur, and cloth, in response to a physics model and/or animation of one or more characters and objects within a computer-generated scene.

The one or more object simulation systems 1360 may further generate simulation data (e.g., motion and position of an object over time) for use by other elements of system 100 or that can be stored in object library 1320. The generated simulation data may be combined with or used in addition to animation data generated by the one or more object animation systems 150. The one or more object simulation systems 1360 may be configured to allow a user to associate additional information, metadata, color, lighting, rigging, controls, or the like, with all or a portion of the generated simulation data.

The one or more object rendering systems 1370 can include hardware and/or software element configured for "rendering" or generating one or more images of one or more computer-generated objects. "Rendering" can include generating an image from a model based on information such as geometry, viewpoint, texture, lighting, and shading information. The one or more object rendering systems 1370 may be invoked by or used directly by a user of the one or more design computers 1310 and/or automatically invoked by or used by one or more processes associated with the one or more design computers 1310. One example of a software program embodied as the one or more object rendering systems 1370 can include PhotoRealistic RenderMan, or PRMan, produced by Pixar Animations Studios of Emeryville, Calif.

In various embodiments, the one or more object rendering systems 1370 can be configured to render one or more objects to produce one or more computer-generated images or a set of images over time that provide an animation. The one or more object rendering systems 1370 may generate digital images or raster graphics images.

In various embodiments, a rendered image can be understood in terms of a number of visible features. Some examples of visible features that may be considered by the one or more object rendering systems 1370 may include shading (e.g., techniques relating to how the color and brightness of a surface varies with lighting), texture-mapping (e.g., techniques relating to applying detail information to surfaces or objects using maps), bump-mapping (e.g., techniques relating to simulating small-scale bumpiness on surfaces), fogging/participating medium (e.g., techniques relating to how light dims when passing through non-clear atmosphere or air) shadows (e.g., techniques relating to effects of obstructing light), soft shadows (e.g., techniques relating to varying darkness caused by partially obscured light sources), reflection (e.g., techniques relating to mirror-like or highly glossy reflection), transparency or opacity (e.g., techniques relating to sharp transmissions of light through solid objects), translucency (e.g., techniques relating to highly scattered transmissions of light through solid objects), refraction (e.g., techniques relating to bending of light associated with transparency), diffraction (e.g., techniques relating to bending, spreading and interference of light passing by an object or aperture that disrupts the ray), indirect illumination (e.g., techniques relating to surfaces illuminated by light reflected off other surfaces, rather than directly from a light source, also known as global illumination), caustics (e.g., a form of indirect illumination with techniques relating to reflections of light off a shiny object, or focusing of light through a transparent object, to produce bright highlights on another object), depth of field (e.g., techniques relating to how objects appear blurry or out of focus when too far in front of or behind the object in focus), motion blur (e.g., techniques relating to how objects appear blurry due to high-speed motion, or the motion of the camera), non-photorealistic rendering (e.g., techniques relating to rendering of scenes in an artistic style, intended to look like a painting or drawing), or the like.

The one or more object rendering systems 1370 may further render images (e.g., motion and position of an object over time) for use by other elements of system 1300 or that can be stored in object library 1320. The one or more object rendering systems 1370 may be configured to allow a user to associate additional information or metadata with all or a portion of the rendered image.

Figure 14:
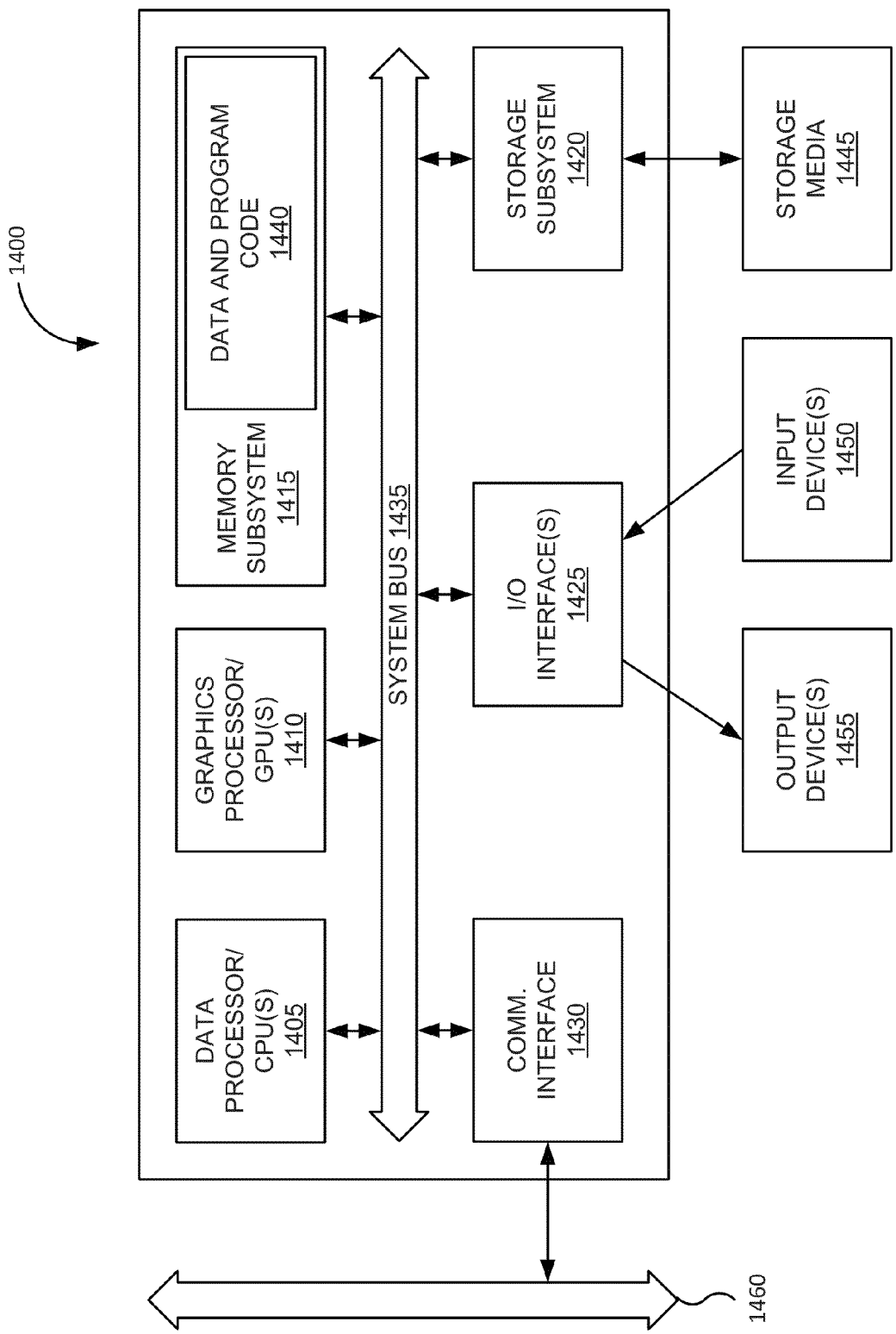
FIG. 14 is a block diagram of a computer system or information processing device that may incorporate an embodiment, be incorporated into an embodiment, or be used to practice any of the innovations, embodiments, and/or examples found within this disclosure.

FIG. 14 is a block diagram of computer system 1400. FIG. 14 is merely illustrative. In some embodiments, a computer system includes a single computer apparatus, where the subsystems can be the components of the computer apparatus. In other embodiments, a computer system can include multiple computer apparatuses, each being a subsystem, with internal components. Computer system 1400 and any of its components or subsystems can include hardware and/or software elements configured for performing methods described herein.

Computer system 1400 may include familiar computer components, such as one or more one or more data processors or central processing units (CPUs) 1405, one or more graphics processors or graphical processing units (GPUs) 1410, memory subsystem 1415, storage subsystem 1420, one or more input/output (I/O) interfaces 1425, communications interface 1430, or the like. Computer system 1400 can include system bus 1435 interconnecting the above components and providing functionality, such connectivity and inter-device communication.

The one or more data processors or central processing units (CPUs) 1405 can execute logic or program code or for providing application-specific functionality. Some examples of CPU(s) 1405 can include one or more microprocessors (e.g., single core and multi-core) or micro-controllers, one or more field-gate programmable arrays (FPGAs), and application-specific integrated circuits (ASICs). As user herein, a processor includes a multi-core processor on a same integrated chip, or multiple processing units on a single circuit board or networked.

The one or more graphics processor or graphical processing units (GPUs) 1410 can execute logic or program code associated with graphics or for providing graphics-specific functionality. GPUs 1410 may include any conventional graphics processing unit, such as those provided by conventional video cards. In various embodiments, GPUs 1410 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 1410 may include any number of registers, logic units, arithmetic units, caches, memory interfaces, or the like.

Memory subsystem 1415 can store information, e.g., using machine-readable articles, information storage devices, or computer-readable storage media. Some examples can include random access memories (RAM), read-only-memories (ROMS), volatile memories, non-volatile memories, and other semiconductor memories. Memory subsystem 1415 can include data and program code 1440.

Storage subsystem 1420 can also store information using machine-readable articles, information storage devices, or computer-readable storage media. Storage subsystem 1420 may store information using storage media 1445. Some examples of storage media 1445 used by storage subsystem 1420 can include floppy disks, hard disks, optical storage media such as CD-ROMS, DVDs and bar codes, removable storage devices, networked storage devices, or the like. In some embodiments, all or part of data and program code 1440 may be stored using storage sub system 1420.

The one or more input/output (I/O) interfaces 1425 can perform I/O operations. One or more input devices 1450 and/or one or more output devices 1455 may be communicatively coupled to the one or more I/O interfaces 1425. The one or more input devices 1450 can receive information from one or more sources for computer system 1400. Some examples of the one or more input devices 1450 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 1450 may allow a user of computer system 1400 to interact with one or more non-graphical or graphical user interfaces to enter a comment, select objects, icons, text, user interface widgets, or other user interface elements that appear on a monitor/display device via a command, a click of a button, or the like.

The one or more output devices 1455 can output information to one or more destinations for computer system 1400. Some examples of the one or more output devices 1455 can include a printer, a fax, a feedback device for a mouse or joystick, external storage systems, a monitor or other display device, a communications interface appropriately configured as a transceiver, or the like. The one or more output devices 1455 may allow a user of computer system 1400 to view objects, icons, text, user interface widgets, or other user interface elements. A display device or monitor may be used with computer system 1400 and can include hardware and/or software elements configured for displaying information.

Communications interface 1430 can perform communications operations, including sending and obtaining data. Some examples of communications interface 1430 may include a network communications interface (e.g. Ethernet, Wi-Fi, etc.). For example, communications interface 1430 may be coupled to communications network/external bus 1460, such as a computer network, a USB hub, or the like. A computer system can include a plurality of the same components or subsystems, e.g., connected together by communications interface 1430 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

Computer system 1400 may also include one or more applications (e.g., software components or functions) to be executed by a processor to execute, perform, or otherwise implement techniques disclosed herein. These applications may be embodied as data and program code 1440. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 1415 and/or storage subsystem 1420.

Such programs may also be encoded and transmitted using carrier signals adapted for transmission via wired, optical, and/or wireless networks conforming to a variety of protocols, including the Internet. As such, a computer readable medium according to an embodiment may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments. However, other embodiments may be directed to specific embodiments relating to each individual aspect, or specific combinations of these individual aspects.

The above description of exemplary embodiments has been presented for the purposes of illustration and description. It is not intended to be exhaustive or to limit the invention to the precise form described, and many modifications and variations are possible in light of the teaching above. The embodiments were chosen and described in order to best explain the principles and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

All patents, patent applications, publications, and descriptions mentioned here are incorporated by reference in their entirety for all purposes. None is admitted to be prior art.

What is claimed is:

1. A computer-implemented method comprising:
    storing, by a processor in a memory, a first voxel array associated with a first voxel in a voxel grid that covers at least a portion of a three-dimensional model, wherein the first voxel array includes:
        a plurality of time values, and
        for each of the plurality of time values, a parameter value of a parameter of an animated scene associated with the first voxel at the time value;

storing, by the processor in the memory, a second voxel array associated with a second voxel in the voxel grid, wherein the second voxel array includes:
   at least one time value, and
      for each of the at least one time value, a parameter value of the parameter of the animated scene associated with the second voxel at the time value,
   wherein at least one of the plurality of time values included in the first voxel array is different from each of the at least one time value included in the second voxel array;
determining, by the processor, using the first voxel array, a first parameter value of the parameter of the animated scene associated with the first voxel at a first time value;
determining, by the processor, using the second voxel array, a second parameter value of the parameter of the animated scene associated with the second voxel at a second time value; and
rendering, by the processor, the animated scene using the first and second parameter values.

2. The computer-implemented method of claim 1, wherein a number of time values in the second voxel array is fewer than a number of time values in the first voxel array.

3. The computer-implemented method of claim 1, wherein a distribution of the plurality of time values included in the first voxel array is different from a distribution of the at least one time value included in the second voxel array.

4. The computer-implemented method of claim 1, wherein the parameter values for each time value of the first voxel array are sampled at a plurality of positions within the first voxel.

5. The computer-implemented method of claim 4, wherein the plurality of time values are random and the plurality of positions within the voxel are random.

6. The computer-implemented method of claim 1, wherein the parameter values stored in a voxel array are generated from sampling at least one parameter value associated with a microvoxel lattice vertex.

7. The computer-implemented method of claim 1, wherein a parameter value at a first time value is determined by sampling at least two parameter values of a fluid simulation field, wherein a first parameter value of a fluid simulation field is sampled at an increased time value that is greater than the first time value and a second parameter value of a fluid simulation field is sampled at a decreased time value that is less than the second time value, and wherein an advection algorithm is used to determine the first time value based on the increased time value and the decreased time value.

8. The computer-implemented method of claim 1, wherein the parameter is density.

9. The computer-implemented method of claim 1, wherein a plurality of parameter values are stored for each time value of the first voxel array and the second voxel array.

10. The computer-implemented method of claim 9, wherein the plurality of parameters include at least one of density, color, opacity, temperature, and attenuation coefficient.

11. The computer-implemented method of claim 1, further comprising compressing data of the second voxel array such that the number of time values in the second array is fewer than the number of time values in the first array.

12. The computer-implemented method of claim 11, wherein compressing the data of the second voxel array includes removing at least one redundant value from the data of the second voxel array.

13. The computer-implemented method of claim 11, wherein compressing the data of the second voxel array includes applying a lossy compression algorithm to the data of the second voxel array.

14. The computer-implemented method of claim 1, further comprising storing an first offset value for the first voxel and storing a second offset value for the second voxel, wherein the first offset value indicates the location in a table of a first sample value for the first voxel and wherein the second offset value indicates the location in the table of a first sample value for the second voxel.

15. The computer-implemented method of claim 1, wherein the voxel grid has a fixed position in the animated scene over the plurality of time values included in the first voxel array.

16. The computer-implemented method of claim 1, wherein determining, using the second voxel array, the second parameter value includes:
   selecting the second time value, the second time value being different from the at least time one value included in the second voxel array; and
   determining the second parameter value of the parameter of the animated scene associated with the second voxel at the second time value based on an interpolation using the parameter value of the parameter of the animated scene associated with the second voxel at the at least one time value.

17. A computer product comprising a non-transitory computer readable medium storing a plurality of instructions that when executed control a computer system to perform computer-generated animation, the instructions comprising:
   storing a first voxel array associated with a first voxel in a voxel grid that covers at least a portion of a three-dimensional model, wherein the first voxel array includes:
      a plurality of time values, and
      for each of the plurality of time values, a parameter value of a parameter of an animated scene in the first voxel at the time value;
   storing a second voxel array associated with a second voxel in the voxel grid, wherein the second voxel array includes:
      at least one time value,
      for each of the at least one time value, a parameter value the parameter of the animated scene associated with the second voxel at the time value, wherein at least one of the plurality of time values included in the first voxel array is different from each of the at least one time value included in the second voxel array;
   determining, using the first voxel array, a first parameter value of the parameter of the animated scene associated with the first voxel at a first time value;
   determining, using the second voxel array, a second parameter value of the parameter of the animated scene associated with the second voxel at a second time value; and
   rendering the animated scene using the first and second parameter values.

18. The computer product of claim 17, wherein a number of time values in the second voxel array is fewer than a number of time values in the first voxel array.

19. The computer product of claim 17, wherein a distribution of the plurality of time values included in the first voxel array is different from a distribution of the at least one time value included in the second voxel array.

20. The computer product of claim 17, wherein the parameter values for each time value of the first voxel array are sampled at a plurality of positions within the first voxel.

21. The computer product of claim 20, wherein the plurality of time values are random and the plurality of positions within the voxel are random.

22. The computer product of claim 17, wherein the parameter values stored in a voxel array are generated from sampling at least one parameter value associated with a micro-voxel lattice vertex.

23. The computer product of claim 17, wherein a parameter value at a first time value is determined by sampling at least two parameter values of a fluid simulation field, wherein a first parameter value of a fluid simulation field is sampled at an increased time value that is greater than the first time value and a second parameter value of a fluid simulation field is sampled at a decreased time value that is less than the second time value, and wherein an advection algorithm is used to determine the first time value based on the increased time value and the decreased time value.

24. The computer product of claim 17, wherein the parameter is density.

25. The computer product of claim 17, wherein a plurality of parameter values are stored for each time value of the first voxel array and the second voxel array.

26. The computer product of claim 25, wherein the plurality of parameters include at least one of density, color, opacity, temperature, and attenuation coefficient.

27. The computer product of claim 17, further comprising compressing data of the second voxel array such that the number of time values in the second array is fewer than the number of time values in the first array.

28. The computer product of claim 27, wherein compressing the data of the second voxel array includes removing at least one redundant value from the data of the second voxel array.

29. The computer product of claim 27, wherein compressing the data of the second voxel array includes applying a lossy compression algorithm to the data of the second voxel array.

30. The computer product of claim 17, further comprising storing an first offset value for the first voxel and storing a second offset value for the second voxel, wherein the first offset value indicates the location in a table of a first sample value for the first voxel and wherein the second offset value indicates the location in the table of a first sample value for the second voxel.

31. The computer product of claim 2, wherein determining, using the second voxel array, the second parameter value includes:
    selecting the second time value, the second time value being different from the at least time one value included in the second voxel array; and
    determining the second parameter value of the parameter of the animated scene associated with the second voxel at the second time value based on an interpolation using the parameter value of the parameter of the animated scene associated with the second voxel at the at least one time value.

\* \* \* \* \*